(12) United States Patent
Srinivasan et al.

(10) Patent No.: US 7,577,420 B2
(45) Date of Patent: Aug. 18, 2009

(54) INSTANT HELP SECURITY SYSTEM FOR EMERGENCY HELP USING 2G, 2.5G AND 3G CELLULAR WIRELESSES HALF DUPLEX CALL

(76) Inventors: Sudharshan Srinivasan, 5496 Golubin Common, Fremont, CA (US) 94555; Jai Kumar, 20360 Clifden Way, Cupertino, CA (US) 95014; Kothandraman Ramchandran, 45426 Potawatami Dr., Fremont, CA (US) 94539

( * ) Notice: Subject to any disclaimer, the term of this patent is extended or adjusted under 35 U.S.C. 154(b) by 484 days.

(21) Appl. No.: 11/354,448

(22) Filed: Feb. 15, 2006

(65) Prior Publication Data

US 2006/0183460 A1   Aug. 17, 2006

Related U.S. Application Data

(60) Provisional application No. 60/654,024, filed on Feb. 17, 2005.

(51) Int. Cl.
*H04M 11/04* (2006.01)

(52) U.S. Cl. ............ 455/404.1; 455/404.2; 455/518; 455/519; 455/521; 370/296; 370/312; 370/432; 340/287; 340/291; 379/37; 379/42; 379/43; 379/44; 379/51

(58) Field of Classification Search ........... 455/404.1, 455/404.2, 518, 519, 521; 370/296, 312, 370/432; 379/37–51; 340/287–304
See application file for complete search history.

(56) References Cited

U.S. PATENT DOCUMENTS

| | | | | |
|---|---|---|---|---|
| 6,310,549 | B1 * | 10/2001 | Loftin et al. | 340/547 |
| 6,725,053 | B2 * | 4/2004 | Rosen et al. | 455/518 |
| 6,874,029 | B2 * | 3/2005 | Hutcheson et al. | 709/227 |
| 7,233,781 | B2 * | 6/2007 | Hunter et al. | 455/404.1 |
| 2002/0076003 | A1 * | 6/2002 | Zellner et al. | 379/49 |
| 2004/0203561 | A1 * | 10/2004 | Jakubowski | 455/404.1 |
| 2005/0200480 | A1 * | 9/2005 | Caras et al. | 340/539.22 |
| 2006/0120516 | A1 * | 6/2006 | Armbruster et al. | 379/37 |
| 2007/0019656 | A1 * | 1/2007 | Martin et al. | 370/401 |

* cited by examiner

*Primary Examiner*—Charles N Appiah
*Assistant Examiner*—Olumide T Ajibade Akonai

(57) ABSTRACT

A security system (52) using cellular wireless half duplex communication call (62) is provided. The security system (52) comprises a set of monitored resources (10), group of owners (48) and group of helpers (50) connected using said cellular wireless half duplex call (52). The monitored resource (10) is configured to generate an alarm and is coupled with said cellular wireless half duplex call (62). Said owners (48) and helpers (50) are also coupled with said cellular wireless half duplex call (62). In an event of emergency said monitored resource (10) generates an alarm and initiates said cellular wireless half duplex call (62) to connect to said owners (48) and said helpers (50) in shortest possible time without significantly contributing to cellular network load. Said security system (52) provides most scalable, efficient and viable security solution using cellular wireless networks.

20 Claims, 19 Drawing Sheets

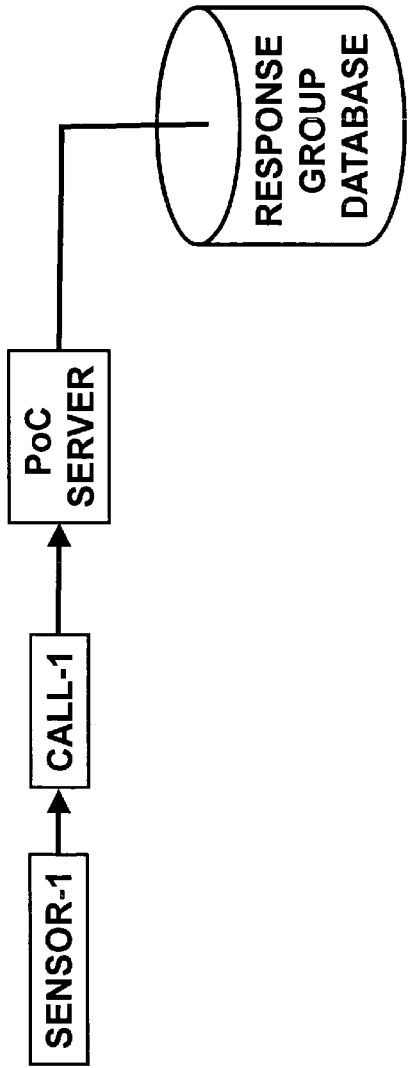

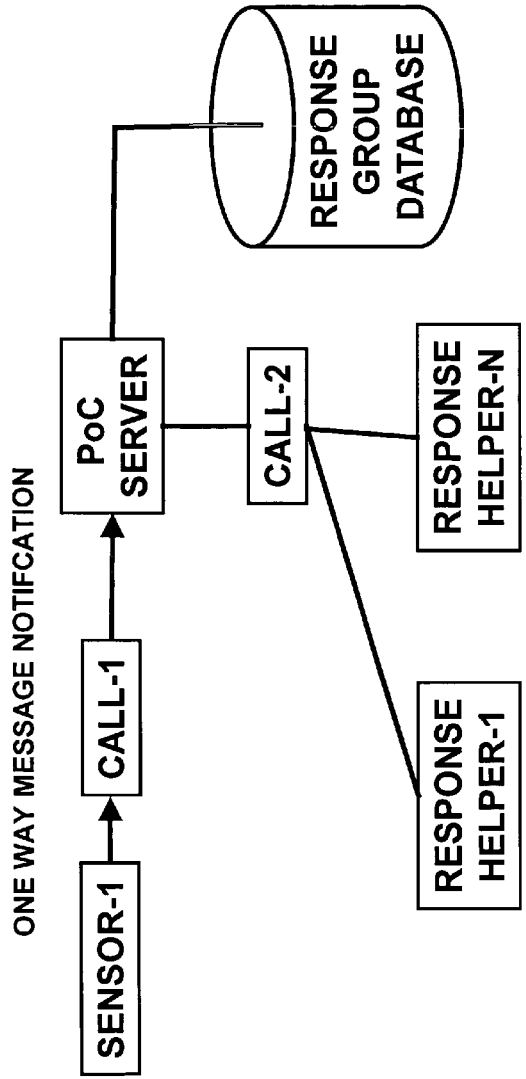

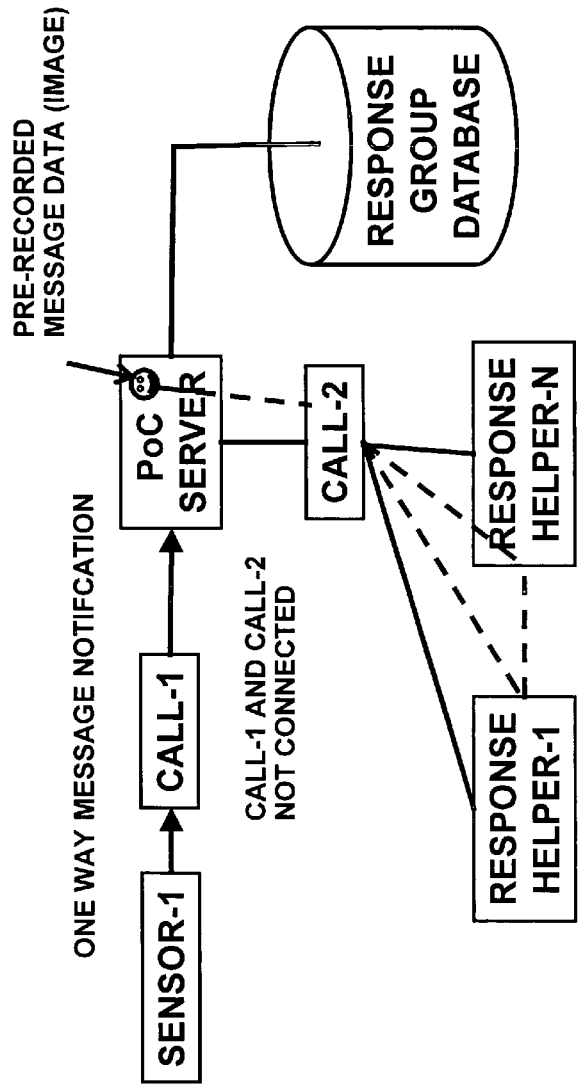

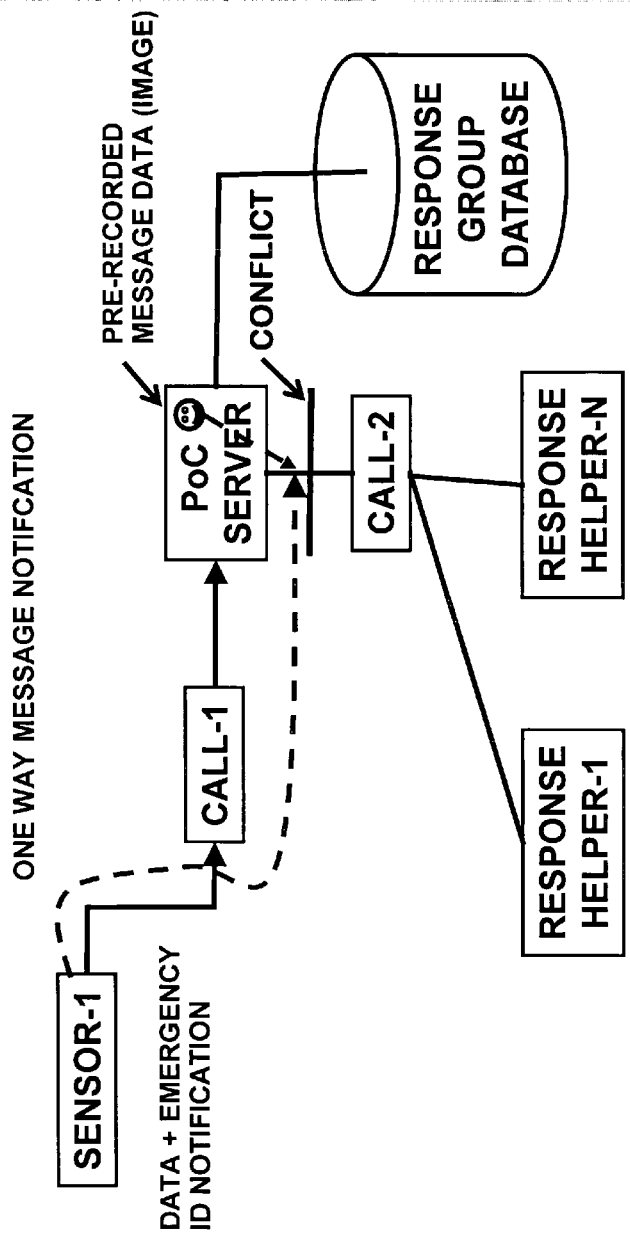

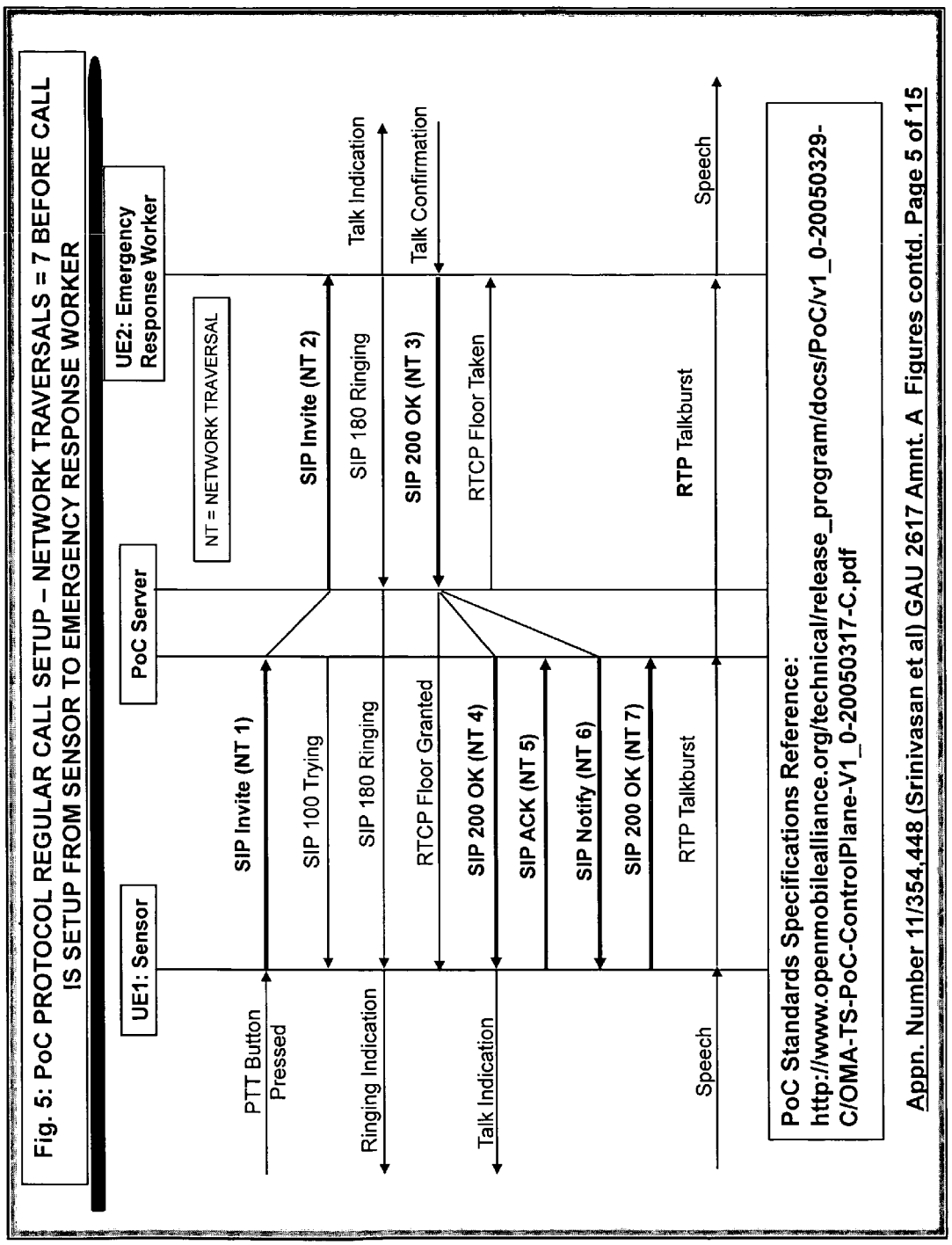

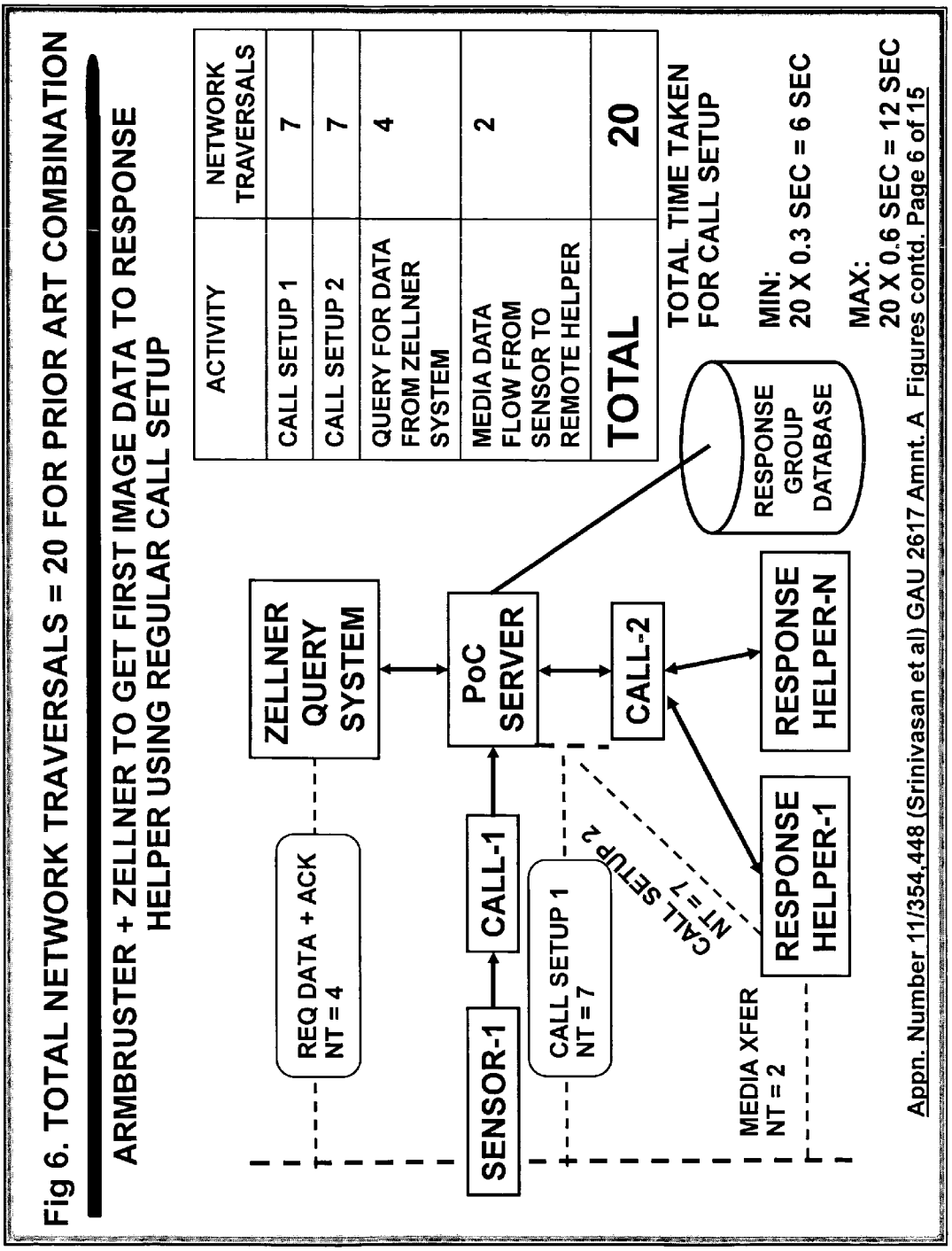

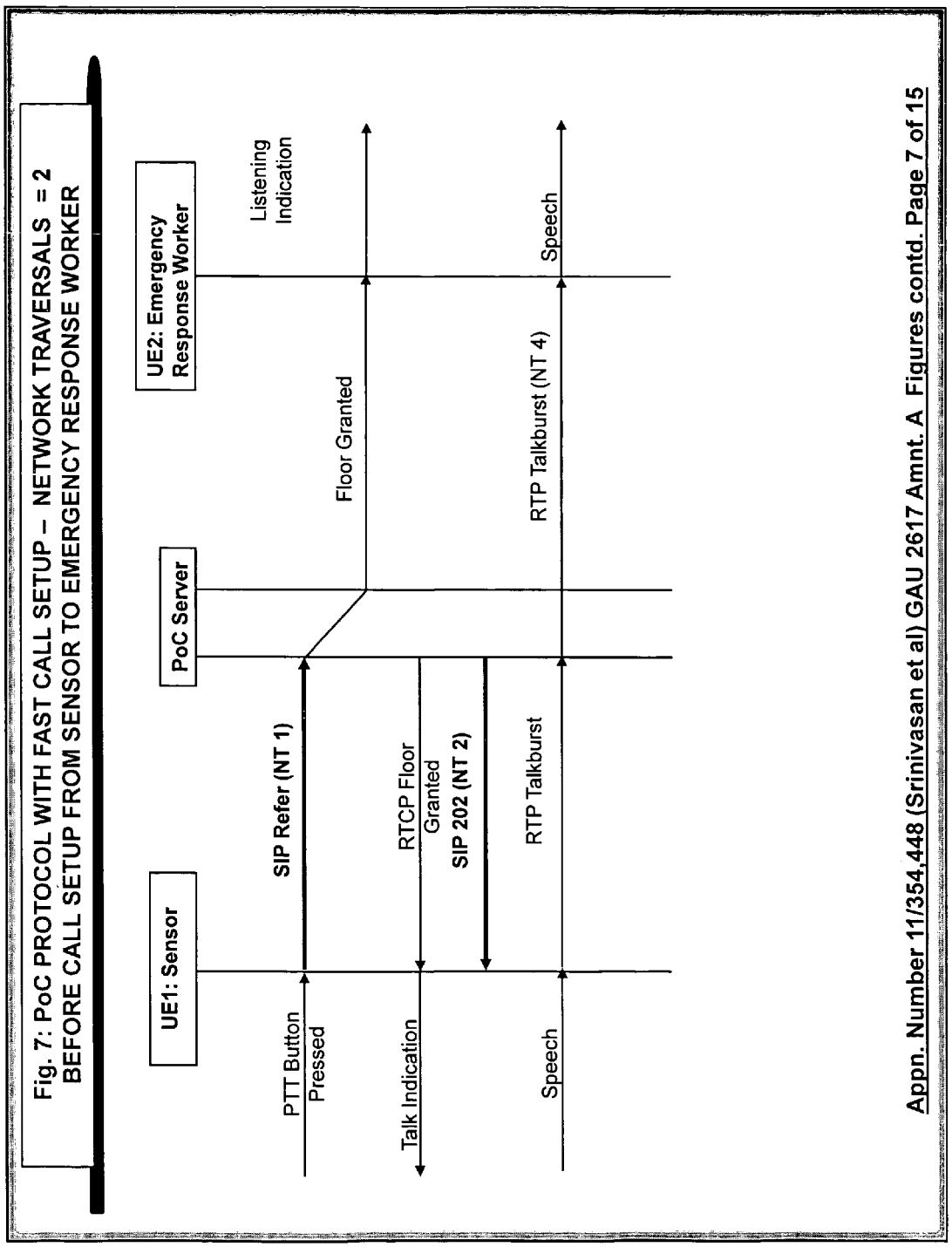

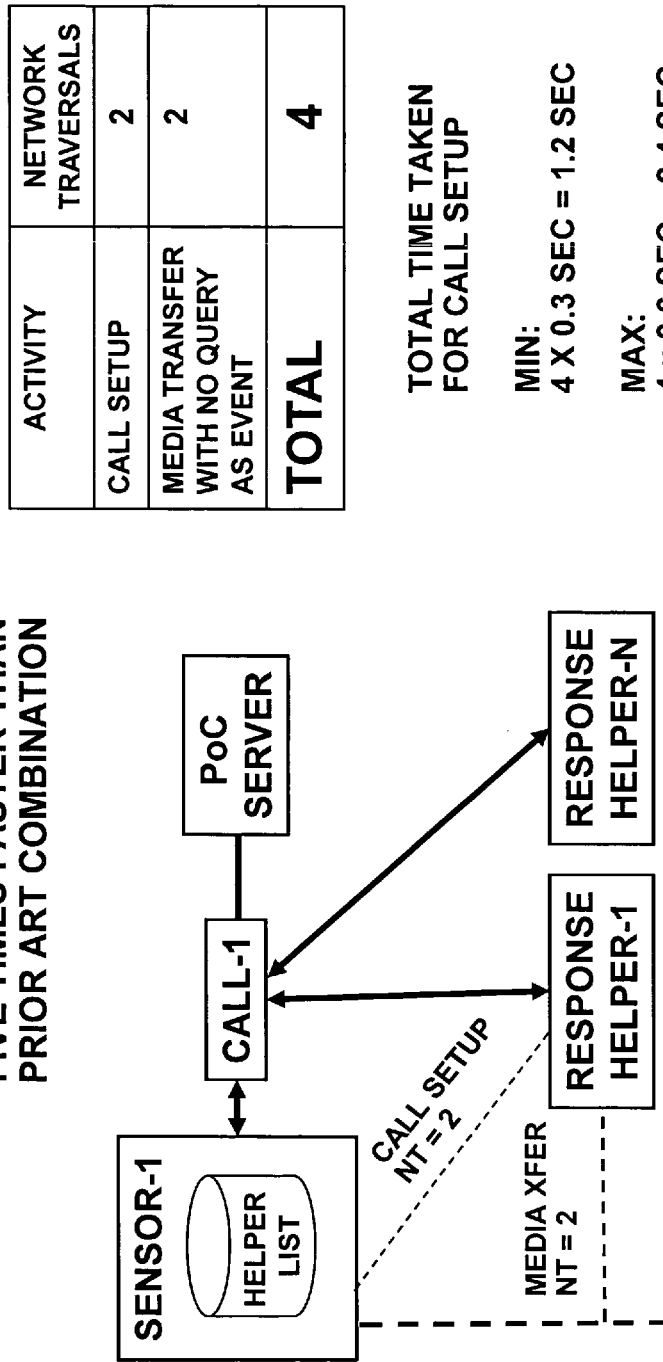

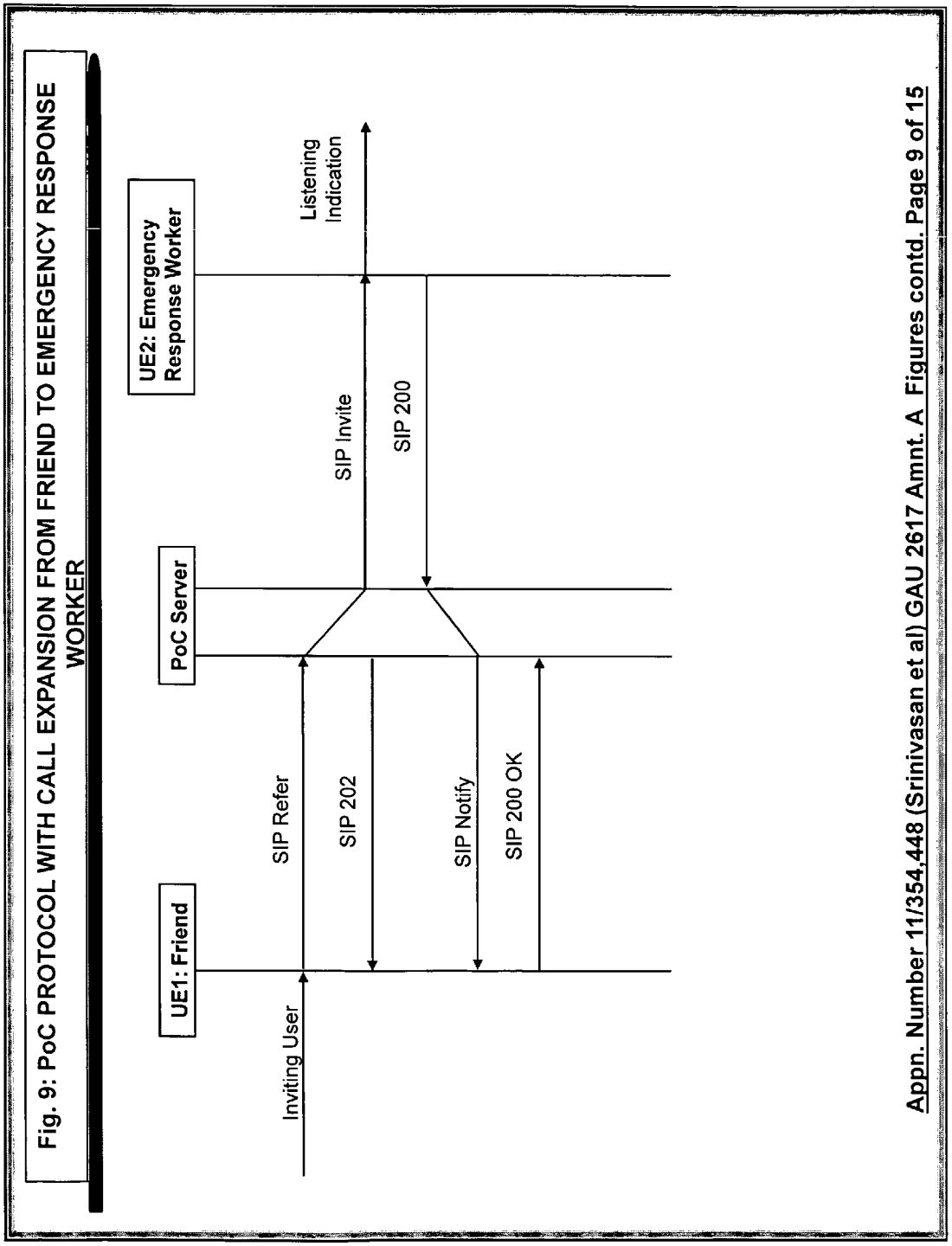

Fig. 10: ARMBRUSTER – FALSE ALARM COST COMPUTATION

SAMPLE ESTIMATE PER SMALL LOCALITY

| ACTIVITY | NETWORK TRAVERSALS |
|---|---|
| Number of Alarms (NA) | 1000 |
| Number of False Alarms (NFA) | 500 |
| Number of Emergency Response Helpers (NERH) | 100 |
| Number of traversals per resource helper (NTRH) | 7 |
| Cost per false alarm (CPFA) | $10 |
| Number of traversals for false alarms (NTFA) | 500 x 100 x 7 = 350,000 |
| Dollars spent on False Alarms (DSFA) | 500 x 100 x 10 = $500,000 |

Appn. Number 11/354,448 (Srinivasan et al) GAU 2617 Amnt. A Figures contd. Page 10 of 15

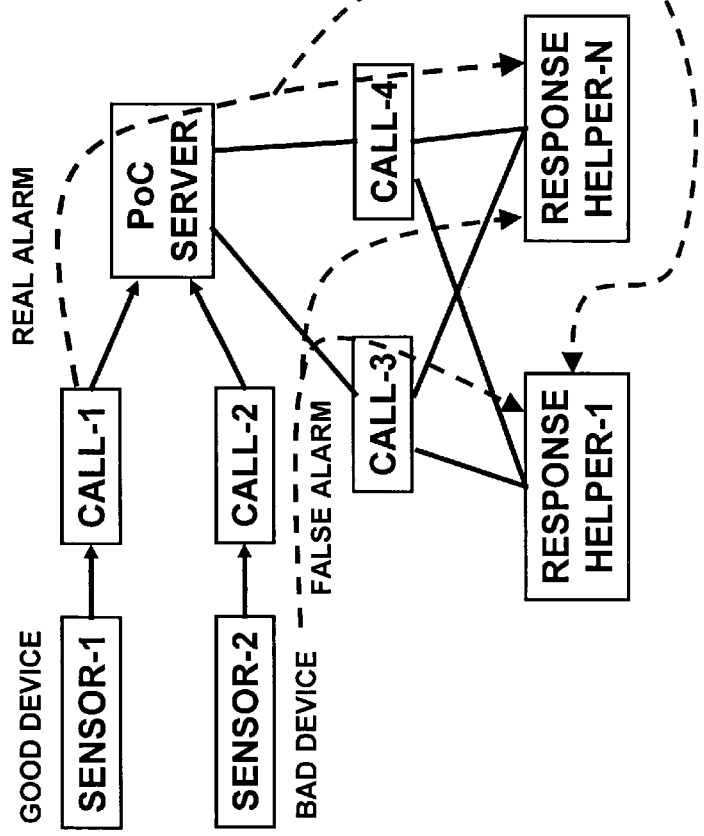

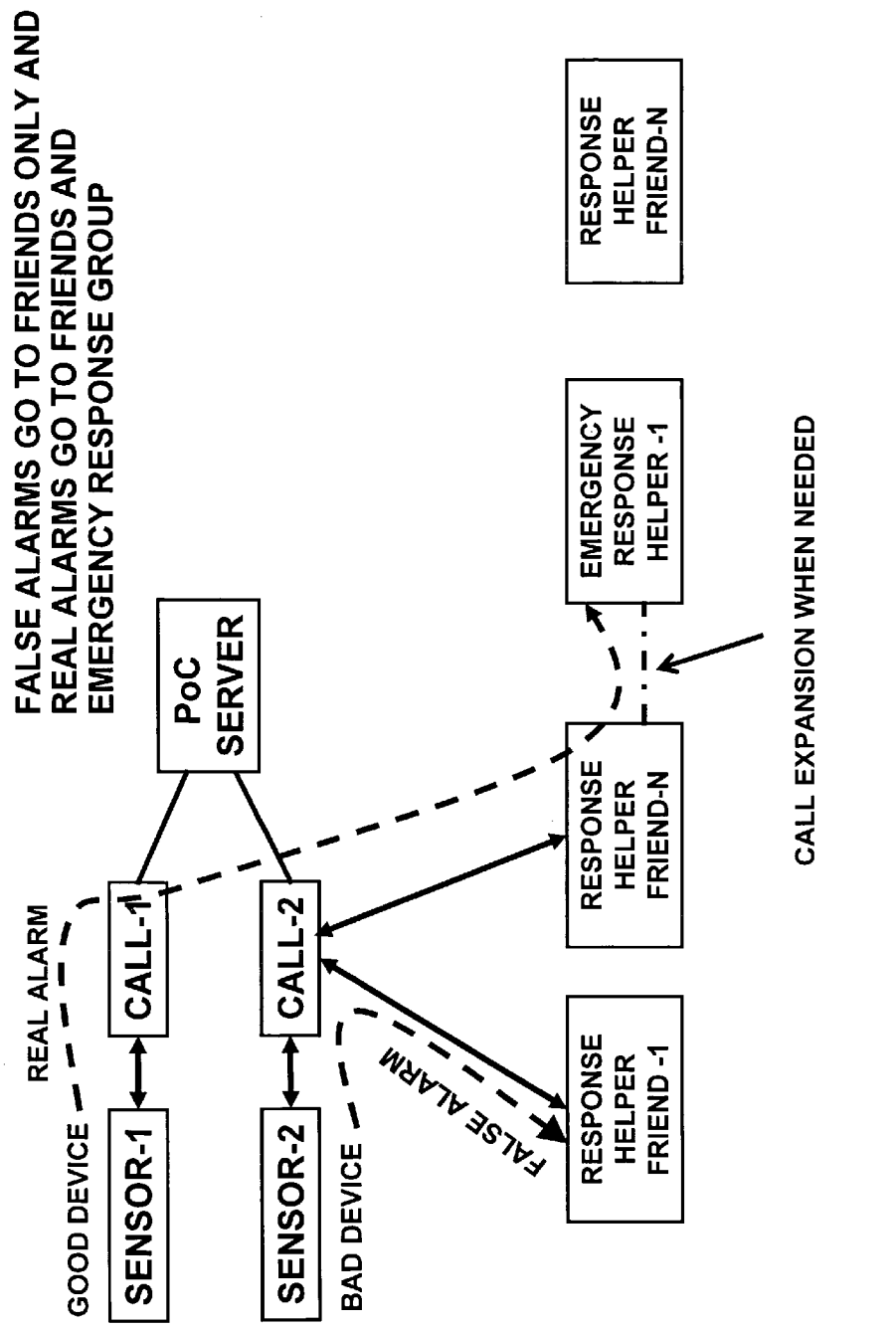

Fig. 13: SRINIVASAN – FALSE ALARM COST COMPUTATION

| ACTIVITY | NETWORK TRAVERSALS |
|---|---|
| Number of Alarms (NA) | 1000 |
| Number of False Alarms (NFA) | 0 |
| Number of Emergency Response Helpers (NERH) | 100 |
| Number of traversals per resource helper (NTRH) | 3 |
| Cost per false alarm (CPFA) | $10 |
| Number of traversals for false alarms (NTFA) | 0 x 100 x 7 = 0 |
| Dollars spent on False Alarms (DSFA) | 0 x 100 x 10 = $0 |

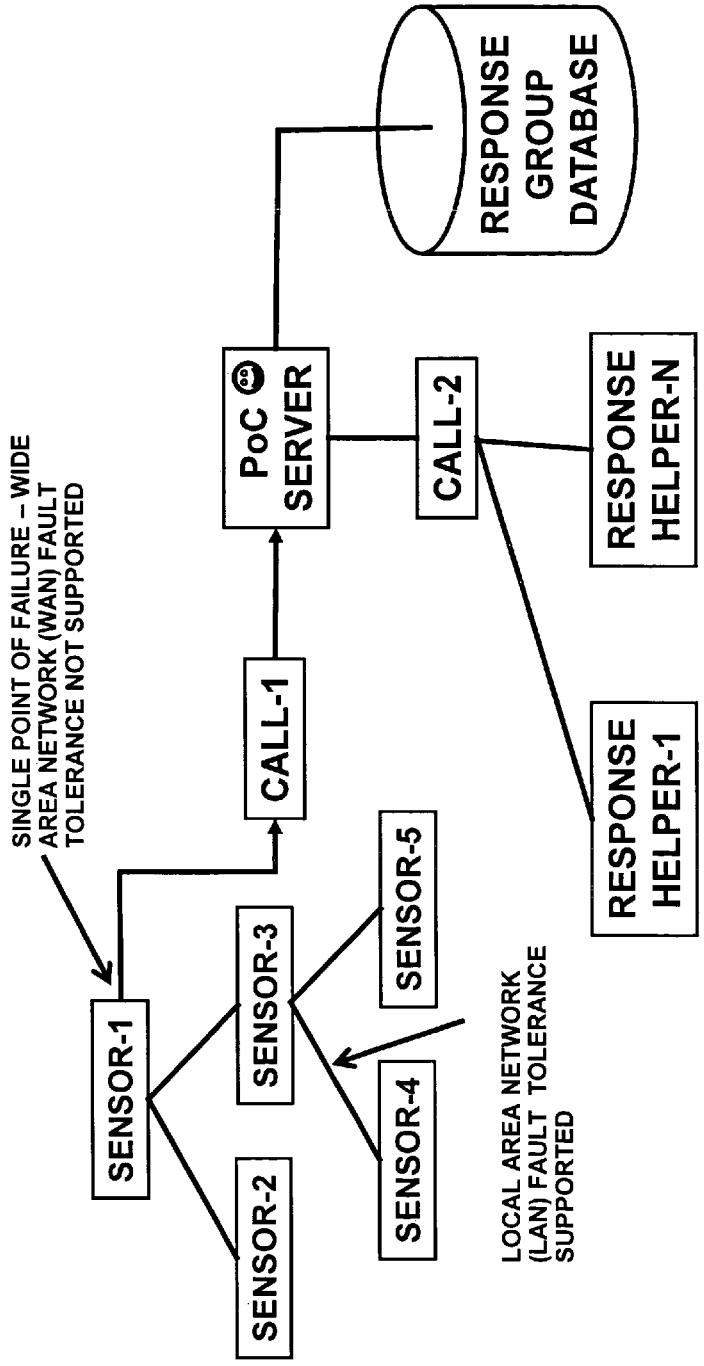

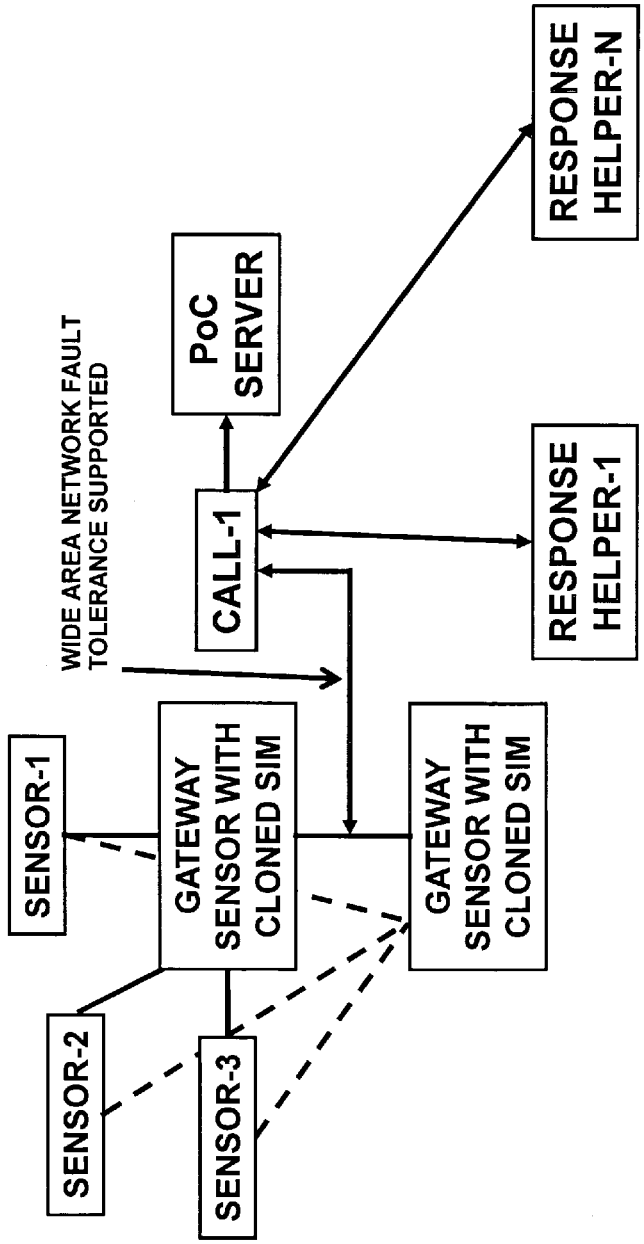

INSTANT HELP SECURITY SYSTEM FOR EMERGENCY HELP USING 2G, 2.5G AND 3G CELLULAR WIRELESSES HALF DUPLEX CALL

CROSS REFERENCE TO RELATED APPLICATION

This is the utility patent of provisional Patent Application U.S. 60/654,024 with a priority date of Feb. 17, 2005.

FIELD OF INVENTION

The present invention generally relates to remote monitoring, intrusion detection and personal safety security systems and specifically to security systems using cellular wireless networks as communication channels in events of emergency.

BACKGROUND OF THE INVENTION—PRIOR ART

The security and remote monitoring industry is well established and provides many products for remote monitoring and intrusion detection. Existing remote monitoring products provide transducers that detect intrusion and notify owners in case of an emergency using one of several methods, including cellular phone call, land line phone call, Voice over IP (VoIP) phone call, instant messages and Short Message Service (SMS).

All such known prior art products focus on generic connectivity methods and data formats that are needed for communication between a remote resource and its owner in case of an emergency. But no known prior art product addresses specific cellular connectivity issues that arise when cellular wireless networks are used as communication channels in case of an emergency.

Cellular networks have been designed for basic voice communication between users. Emergency situations bring up several connectivity issues that are not addressed in existing cellular networks. Existing cellular networks suffer from connectivity issues such as long call establishment times, lack of prioritization between emergency call and a regular call, lack of methods to instantly connect to a group of helpers without occupying a full duplex channel for each helper, lack of methods to exchange any other data except voice, lack of methods to provide grades of service connectivity, lack of methods to expand a group of helpers with new group of helpers and lack of methods to charge a owner for all cellular charges that might be incurred due to an emergency call.

Such cellular connectivity issues significantly affect levels of service that a security system provides. Due to increased number of cellular users, most cellular networks experience congestion, and if an alarm event occurs during this period, a regular cellular full duplex phone call may not connect, thereby contributing to delays in responding to an emergency call. Owners may not be contactable due to dead zones and hence more than one owner or a set of helpers must be reached at the time of emergency using full duplex cellular call, thereby contributing to system overload and further congestion. If a set of helpers that are initially contacted are not in a position to offer immediate help, and a new set of helpers cannot be quickly added to communication channel, valuable time will be lost in case of an emergency. If calls are dropped and a new full duplex call cannot be established then valuable information from remote site may be lost. If emergency cellular usage charges are not billed to the owner and are billed to helpers, then many helpers would refuse help if such calls become frequent.

It can be seen that without resolving said cellular connectivity issues, any security system implemented using regular cellular full duplex cellular calls will not scale to millions of users and provide acceptable levels of service due to limited, un-guaranteed bandwidth availability. Hence there is a need for a new security system that provides methods specifically designed to resolve said cellular connectivity issues.

There are many prior art systems that offer security solutions for intrusion detection and remote monitoring and are broadly categorized as video surveillance, real-time services, multiple monitor systems, cellular phone notification systems, internet based security systems etc. But no known prior art specifically addresses said cellular connectivity issues for implementing a scalable and commercially viable security system in bandwidth constrained cellular wireless networks.

The following paragraphs in current section include relevant prior art in this field.

There are security systems that establish calls using regular cellular wireless full duplex call between a resource in emergency and a helper or owner. Refer to claims section to get further details on meaning of resource. Due to the number of signaling messages to establish a full duplex call, it can take several seconds to establish a single call. This could be between five and sixty seconds. This latency in call establishment is compounded if there are many helpers to be dialed, as there are no methods provided to simultaneously dial several phone numbers and hence each number has to be dialed sequentially. Latency becomes compounded especially when first set of owners and helpers are not available and next set of owners and helpers can be attempted only after waiting for several rings from the first set of owners and helpers.

In addition, no methods are provided to prioritize an emergency call from regular calls while experiencing congestion. There are no methods provided to override user preferences that are setup to disable rings. There are no methods provided to automatically connect a call and turn on speaker so an emergency request can be heard at helpers end without user intervention. Hence such systems cannot offer a scalable security system using existing cellular wireless full duplex calls.

Some prior art systems use voice over internet protocol (VoIP) to setup a communication channel, but VoIP is a full duplex protocol meant for networks that have high bandwidth, low latency and predictable delays. Current cellular data networks such as second generation (2G), two point five generation (2.5G) and third generation (3G) suffer from high latency, low bandwidth and variable delays. Hence such networks are unsuitable for full duplex VoIP based communication.

The U.S. Doc. No. 20040086093 describes a system of using VoIP to setup a communication channel in an emergency situation. This document primarily addresses issues regarding proprietary implementation of security systems and multiple device connectivity issues and provides VoIP based security system as a solution to provide standards based solution. But this does not address any of the above said cellular connectivity issues. Cellular connection is mentioned here as one of several end-points using VoIP server and Common Channel Signaling System number 7 (SS7) gateway. Hence this system will suffer from all of the said cellular connectivity issues.

Some prior art systems use instant messages to notify owners about an emergency. Instant messaging in cellular networks use short message service (SMS) that is a store and forward technology and hence there are no time limits as to when a SMS will be delivered. Hence such systems are unreliable to be used in case of an emergency.

There are several remote monitoring systems that enable viewing of remote locations using video cameras and internet. Such systems do not address said cellular connectivity issues.

There are systems that use availability metrics of users before establishing a connection. Cellular networks do not provide such availability information to external applications. Cellular networks internally can track a user moving between cell sites but information regarding a user entering a dead zone or turning off ringer or entering a crowded cell site is not available and impractical to gather due to the immense amount of availability data that will be generated to be effectively managed for millions of users.

The U.S. Doc. No. 20030062997 describes a system to notify users based on rules of availability and network efficiency in general. But this does not specifically address any said cellular connectivity issues.

There are systems that use proprietary wireless technology to notify neighborhood in case of an emergency. Such systems are impractical due to proprietary nature of the technology as an entire network including access points, devices and switches needs to be custom manufactured.

The U.S. Doc. No. 20030184436 describes such a system. But this does not address any said cellular connectivity issues.

There are systems that enable connectivity between monitored resource and a security monitoring service using public switch telephone network (PSTN) call. In such systems a monitoring agent makes calls to cellular phone numbers of owners using regular POTS network. This procedure can take several minutes and suffers from the same set of connectivity issues as mentioned above.

There are systems that enable multiple watch points to monitor a remote resource but such systems do not offer methods to specifically address said cellular connectivity issues.

The U.S. Doc. No. 20030214401 describes such a system.

There are also several alarm monitoring systems to detect intrusion in a premises, but most such systems deal with issues of reliably detecting intrusion and communicating this information to a controller in fault tolerant manner.

The U.S. Doc. No. 20030193393 describes one such system to provide fault tolerant communication between transducers and controller. But this does not address any said cellular connectivity issues.

There are systems that enable transfer of audio, video and data on a real time basis but all of such systems address a different issue of verifying whether there has been an intrusion. Such systems do not address said cellular connectivity issues.

The U.S. Pat. No. 6,778,085 describes a real time video and/or image monitoring system wherein emergency response agencies are connected to a remote location. But this does not address said cellular connectivity issues.

The U.S. Pat. No. 6,778,085 describes a system wherein a wireless command unit interacts with an operator who has access to the monitored resource. This does not use cellular wireless technology and hence does not address said cellular connectivity issues.

The U.S. Pat. No. 6,433,683 describes devices capable of using cellular RF transceivers to transmit and receive audio/video signals. This does not address said cellular connectivity issues.

The U.S. Pat. No. 6,385,772 describes a security system in which an alarm is notified using a regular cellular phone call and information is retrieved using a browser. This does not address said cellular connectivity issues.

As can be seen from above no known prior arts address said cellular connectivity issues that arise while using a regular cellular wireless full duplex call in a security system.

BACKGROUND OF THE INVENTION—OBJECTS AND ADVANTAGES

Accordingly, several objects and advantages of the present invention are:

a) to provide methods to connect a resource in emergency with a group of helpers in less than two seconds using cellular wireless networks thereby improving on regular cellular full duplex call establishment times by several orders of magnitude.

b) to provide methods to distinguish emergency calls from regular calls thereby increasing the chance of emergency call connectivity.

c) to provide methods to establish connectivity to a group of helpers without introducing undue load on cellular wireless networks thereby providing a scalable security system on existing wireless cellular networks.

d) to provide methods to automatically re-establish connectivity in case of a failed or dropped connections thereby providing a fault tolerant security system.

e) to provide methods to expand set of helpers to a new set of helpers on a need by basis thereby increasing the chance of timely help in case of an emergency without introducing undue load on cellular wireless infrastructure.

f) to provide methods to redirect all cellular charges to owner of resource that originated the emergency call thereby encouraging more helpers to join a emergency call for help.

g) to provide methods to setup time zone based helper watch list that enables round the clock monitoring without a need for centralized monitoring agency.

SUMMARY

In accordance with present invention a security system combining monitored resource, cellular wireless half duplex communication call and a set of new methods, is implemented to address said cellular connectivity issues that arise while using cellular wireless full duplex calls in an emergency. Cellular wireless half duplex calls provide connectivity without holding a wireless full duplex channel for prolonged periods of time. This implies that a set of helpers can be simultaneously connected to without adding undue load on the cellular network. Only when data needs to be transferred, channel is utilized in one direction. Cellular wireless half duplex calls also provide fast call setup methods to establish calls with minimal round trips. This will enable transfer of data from a remote resource in emergency to set of helpers and owners in the shortest possible time. New methods to override call accept preferences that can be utilized in case of an emergency will enable wider reach to set of helpers and owners since some helpers may have turned off their ringer or requested for a do not disturb mode. New methods to transfer voice, audio, video and textual information into a cellular wireless half duplex call will enable more information to be transferred from remote resource to set of helpers and owners in case of an emergency. Cellular wireless half duplex calls enable group setup procedures. New methods to setup an emergency group and prioritize calls will enable faster connection in case of an emergency. Note that half duplex communication is done on a different set of channels that do not collide with full duplex calls. Given these parameters, it can be seen that combining cellular wireless half duplex call with a monitored resource and adding security system specific methods will provide an unobvious result of fast, efficient, scalable, expandable, and commercially viable instant help cellular wireless security system.

DRAWINGS—FIGURES

DRAWINGS—REFERENCE NUMERALS

Figure 16:
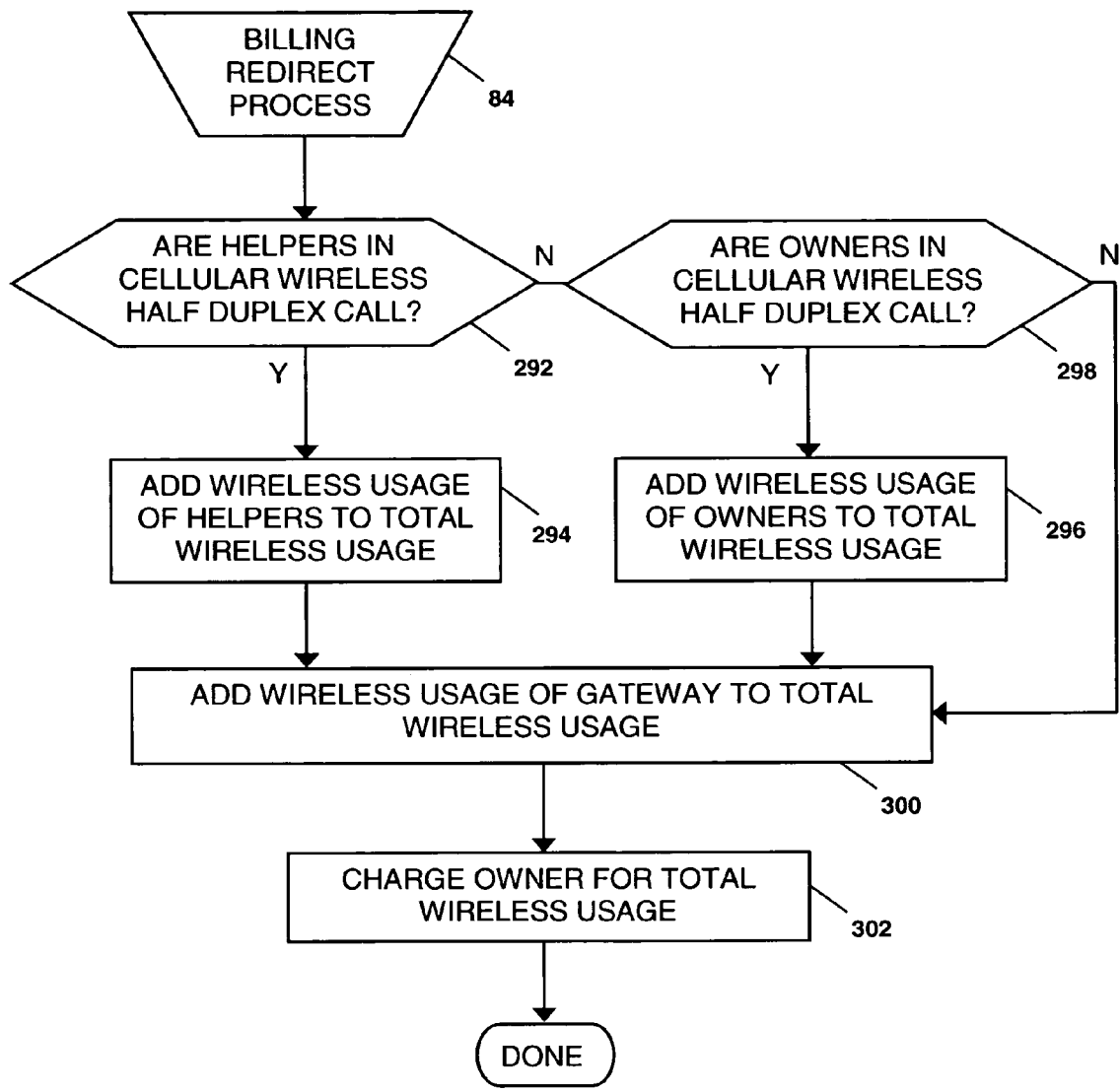
FIG. 16 shows a flow chart for billing redirect process in accordance with preferred embodiment of present invention.

10 Monitored resource
11 Data that is transferred
12 Data gathering agent
14 Inter-data gathering agent connectivity
15 Data change event
16 Active gateway
18 Cellular wireless network connection
20 Multiple element extender
22 Connectivity between monitored resource and data gathering agent
24 Other gateway
26 Gateway data gathering agents
28 Standby gateway
30 Origination base station controller
32 Modified PoC server
34 Connectivity between base station controller and cellular wireless network
36 High speed land line connectivity between modified PoC server and cellular wireless network
42 Cellular Wireless Network
46 Destination base station controller
48 Owner
50 Helper
52 Security system
60 Contact list
62 Cellular wireless half duplex call
64 Cellular wireless half duplex call switching agent
68 Method to invoke fast call setup
70 Billing agent
71 Presence information in PoC server
72 PoC server—prior art
81 Method to setup emergency contact list
82 Emergency contact list
84 Process redirect billing
86 Process call expansion
88 Process low help alert
92 Method for session key generation
94 Method for overriding call accept preferences
96 Method for prioritizing calls
100 Process for call access control
102 Process for helper scheduling
122 Window
124 Door
126 Home
128 Car
130 Warehouse
132 Office
134 Laptop
136 Person in emergency
142 Window sensor
144 Motion sensor.
148 Microphone
150 Still camera
152 Video camera
153 Cellular camera phone
154 Speaker
155 Packetizer/De-packetizer
156 Vocoder
157 Prior art PoC Client
158 PoC client security service logic
159 Modified PoC client
162 Cellular wireless interface
163 Regular SIM card
164 Inter-data gathering agent connectivity interface
165 Cloned SIM card
166 Process for data gathering
168 Process for data dispatching
169 Local storage at gateway
170 Process for call control
171 Conditions and corresponding actions
180 Resource owner device
184 Resource helper device
192 Associate monitored resource with data
194 Associate monitored resource with data gathering agents
196 Associate data gathering agents with other data gathering agents to form local network
198 Nominate one data gathering agent as active gateway
200 Associate active gateway with cellular wireless connectivity
202 Detect change in data
204 Create data change event
206 Transfer data change event and data to active gateway
208 Process event at active gateway 210 Store data locally at active gateway
212 Check if emergency event is detected at active gateway
220 Initiate cellular wireless half duplex call
222 Override call accept preferences
224 Check if emergency fast call setup is available
226 Invite helper to new cellular wireless half duplex call
227 Invoke emergency fast call setup method
228 Wait for helper to accept cellular wireless half duplex call
229 Invoke fast call setup method
230 Helper accepts cellular wireless half duplex call
232 Cellular wireless half duplex call established
234 Transfer data into cellular wireless half duplex call
236 Emergency fast call setup method
242 Receive data at owners and helpers
244 View data
246 Check if more data is needed
247 Check if moderator is assigned
248 Check if owner is in cellular wireless half duplex call
250 Owner nominated as moderator
252 Helper nominated as moderator
254 Method to nominate moderator
255 Moderator
256 Moderator assigns cellular wireless half duplex call ownership to active gateway
258 Moderator requests more data
260 Check if active gateway is cellular wireless half duplex call owner
262 Request more data from data gathering agent
276 Check if number of helpers is sufficient
278 Moderator picks helper
280 Helper selects own helper list
282 Helper invites new helpers to current cellular wireless half duplex call
292 Check if helpers are in cellular wireless half duplex call
294 Add wireless usage of helpers to total wireless usage
296 Add wireless usage of owners to total wireless usage
298 Check if owners are in cellular wireless half duplex call
300 Add wireless usage of gateway to total wireless usage
302 Charge owner for total wireless usage
310 Check if cellular wireless half duplex call is initiated for emergency by active gateway
314 Send per session access control keys to helpers and owners
316 Check if plurality of helpers are in cellular wireless half duplex call
318 Enable access to cellular wireless half duplex call
320 Deny access to cellular wireless half duplex call
330 Check if number of helpers is zero or less than required number
332 Setup timeout and check again
334 Invoke a cellular wireless half duplex call to owners to warn about low helper availability
336 Deliver low help warning alert to helpers
340 Partition helpers into day and night time zones
342 Check if it is night time at monitored resource location
344 Schedule day time zone helper
346 Schedule night time zone helper

DETAILED DESCRIPTION OF PREFERRED EMBODIMENT

Figure 1:
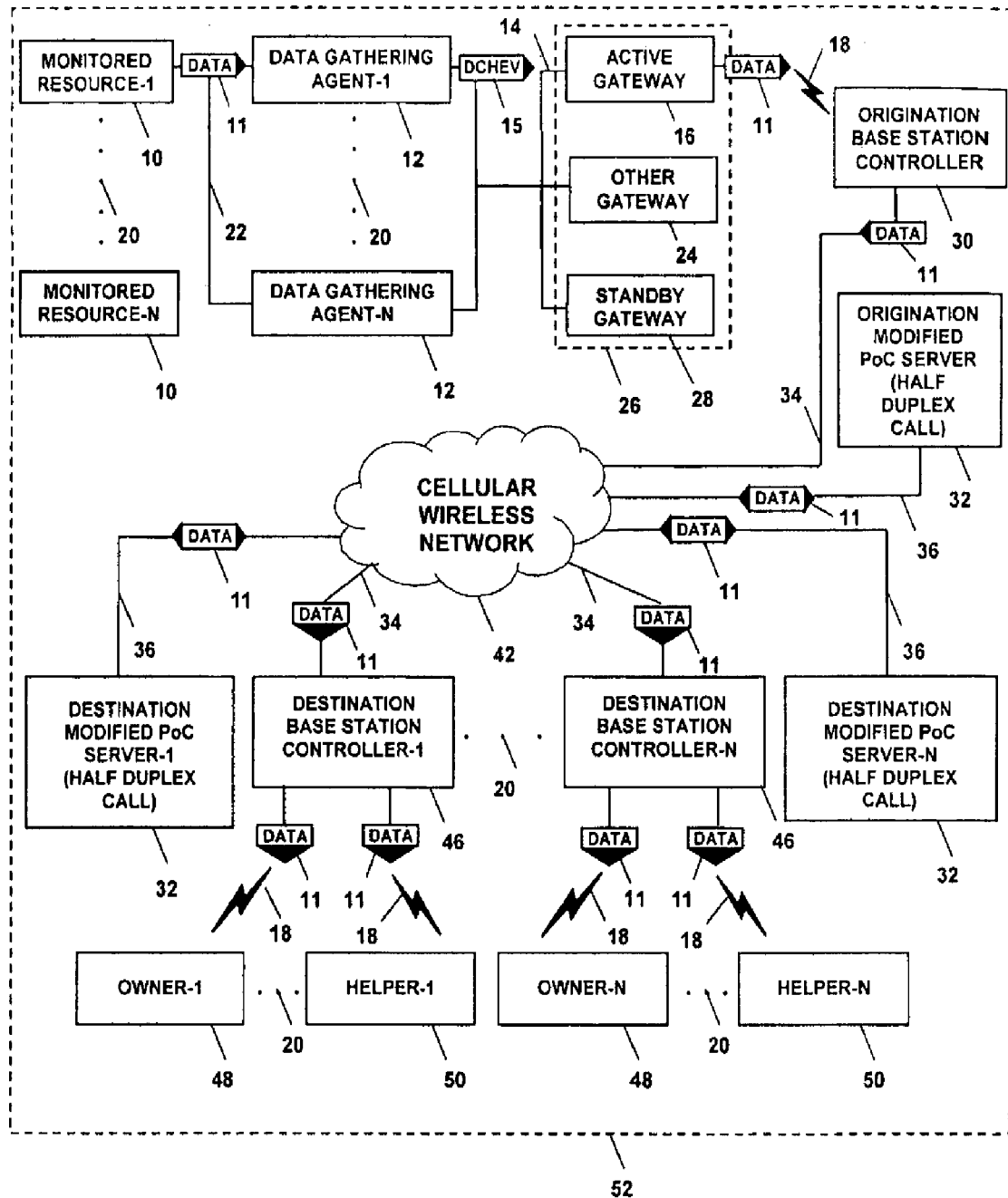
FIG. 1 shows a block diagram depicting said security system in accordance with preferred embodiment of present invention.

The below paragraphs are structured as follows. First, FIG. 1 is described that presents overall functionality and interconnections among different parts of security system 52. This overall functionality may refer to independent parts of the system that are later described in independent sections starting with corresponding figure numbers. Note that the term process is used below to indicate a series of methods interconnected with programming logic and a method is a series of steps as per patenting terminology specified by USPTO. Note also that dots 20 in FIG. 1 represent multiple instances of any entity in proximity to said dots.

FIG. 1 shows a block diagram depicting a security system in accordance with preferred embodiment of present invention. Each monitored resource 10 is associated with one or more data gathering agents 12. Each data gathering agent 12 is associated with only one monitored resource 10. Connectivity 22 between a monitored resource 10 and data gathering agent 12 is established by using sensing technology comprising wired contact sensing, magnetic contact sensing, motion sensing, audio sensing, image change sensing, video change sensing, key press and touch screen press.

Connectivity among data gathering agents is established using inter-data gathering agent connectivity 14 formed with technologies such as Bluetooth, Wireless local area network, wired Ethernet, Zigbee, wired twisted pair cabling, HomeRF, inter-chip connectivity and inter-software module connectivity.

Some data gathering agents are setup with cellular wireless connectivity 18 to connect to cellular wireless network 42 via origination cellular base station controller 30 and are named as gateway data gathering agents 26. One such gateway data gathering agent is named active gateway 16 and optionally, at least one gateway data gathering agent is named standby gateway 28. This enables fault tolerance to avoid a single point of failure. All remaining gateway data gathering agents are named other gateway 24 that may be setup as standby gateways 28 for further fault tolerance. Standby gateway 28 may use a cloned subscriber identity module (SIM) 165 to avoid dual cellular connectivity charges. Use of cloned SIM 165 is possible since standby gateway 28 is invoked only when active gateway 16 goes out of service thus avoiding any conflicts in SIM usage.

Both Origination base station controller 30 and destination base station controllers 46 are connected to cellular wireless network 42 using high speed land line connectivity 34.

Data gathering agents 12 monitor change in data 11 about monitored resource 10 and generate a data change event 15 if a change is detected. A data gathering agent 12 can also be queried for data 11 about a monitored resource 10. When change in data is detected, data 11 and corresponding data change event 15 are transferred from data gathering agents 12 to active gateway 16 using inter-data gathering agent connectivity 14. If active gateway 16 is not available, then a standby gateway 28 is used to enable fault tolerance. This is further detailed in data gathering process FIG. 12.

Active gateway 16 stores conditions and corresponding actions 171 to evaluate if data change event 15 that generated a data transfer is an emergency event. If an emergency event is detected then active gateway 16 initiates a cellular wireless half duplex call 62 to a group of helpers and owners. This group is identified by an emergency contact list 82 and is stored in modified PoC server 32. This is further detailed in data dispatching process FIG. 13.

The PoC server 72 as per the 3rd Generation Partnership Project (3GPP) and Open Mobile Alliance (OMA) standards specifications provide basic methods to setup a contact list and initiate a cellular wireless half duplex call 62. In order for PoC server 72 to be used in security system 52, new methods are to be added to PoC server 72. The next paragraph lists new methods and processes that are added to PoC server 72. With these new methods and processes, PoC server 72 will be called modified PoC server 32 hereafter.

Modified PoC Server 32 Provides:
  a) method 81 to setup emergency contact list 82 based on local time zones of helpers located across the globe.
  b) process 84 to redirect billing charges from all helpers 50 to monitored resource owners 48 in case of an emergency.
  c) process 86 to expand an emergency cellular wireless half duplex call 62 with more helpers 50 on a need to do basis.
  d) process 88 to track all helpers 50 in emergency contact list 82 and generate a warning message to owners 48, if number of helpers 50 accessible becomes zero or less than a preset threshold.
  e) method 92 to generate session level keys to control access to established emergency cellular wireless half duplex call 62 to authorized owners 48 and helpers 50 only.
  f) method 94 to override call accept preferences of owners 48 and helpers 50 in case of emergency.
  g) method 96 to prioritize between emergency and non-emergency cellular wireless half duplex call 62.
  h) process 100 to control access to said cellular wireless half duplex call 62 by using method 92.
  i) process 102 to schedule helpers based on their time zones.
  j) method 236 to invoke fast call setup method 68, if a cellular wireless half duplex call 62 has been initiated for emergency contact list 82.
  k) method 254 to nominate a moderator 255 in cellular wireless half duplex call 62 who can assign call ownership of said call to active gateway 16 to interactively control flow of data 11 from active gateway 16 into cellular wireless half duplex call 62.

Figure 3:
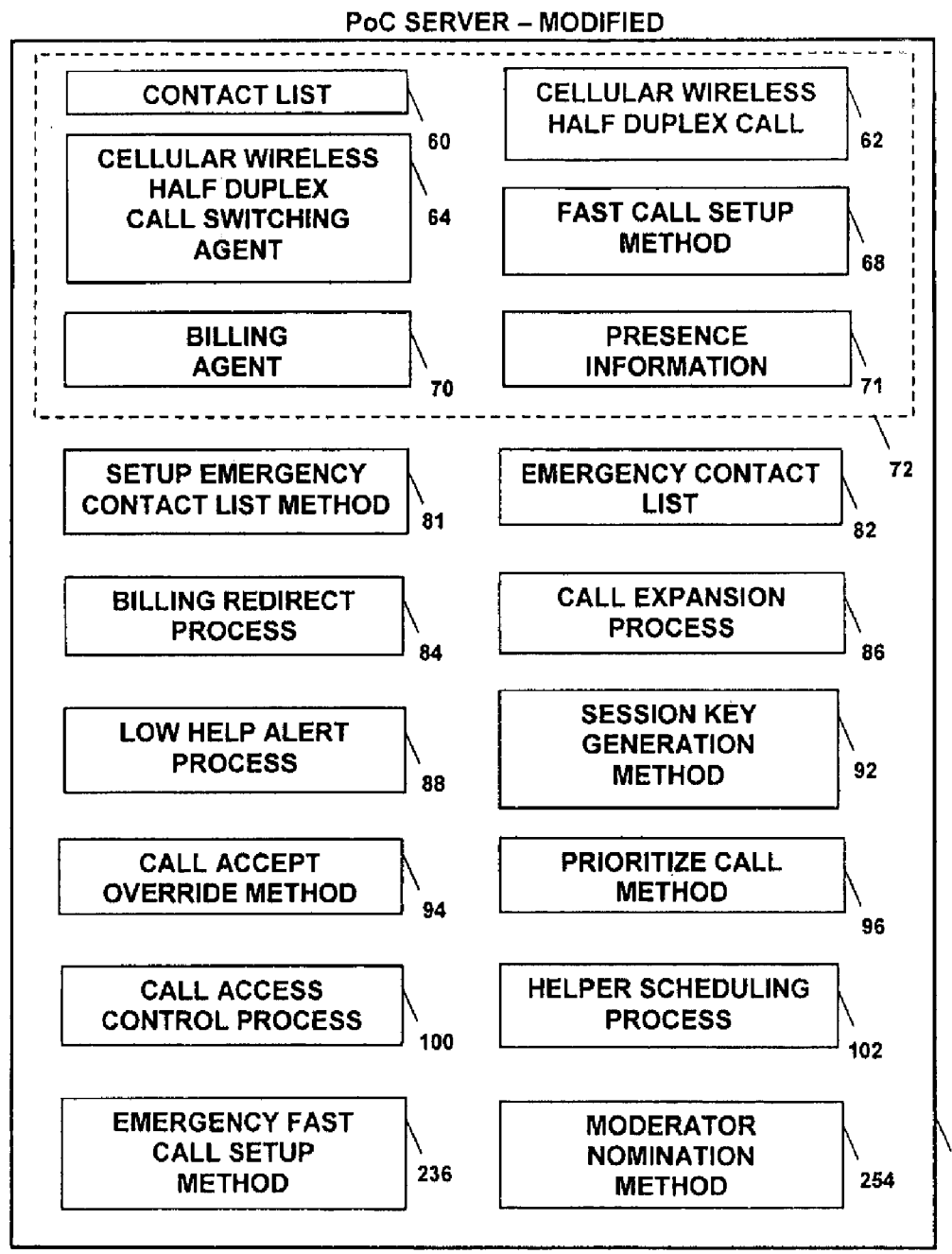
FIG. 3 shows a modified PoC server.

The above list is depicted in FIG. 3.

Both origination modified PoC server 32 and destination modified PoC server 32 are connected to cellular wireless network 42 using high speed land line connectivity 36.

After above methods and processes are added, emergency contacts are setup into emergency contact list 82 in modified PoC server 32. This enables cellular wireless half duplex call 62 to be made to emergency contact list 82 in case of an emergency.

Remote monitoring devices 180,184 are then configured to access active gateway 16 through modified PoC server 32. These remote monitoring devices 180,184 are used by owners 48 and helpers 50 to access data 11 about monitored resources 10 both in case of an emergency and data viewing session initiated by owner 48 and/or helpers 50.

Figure 7:
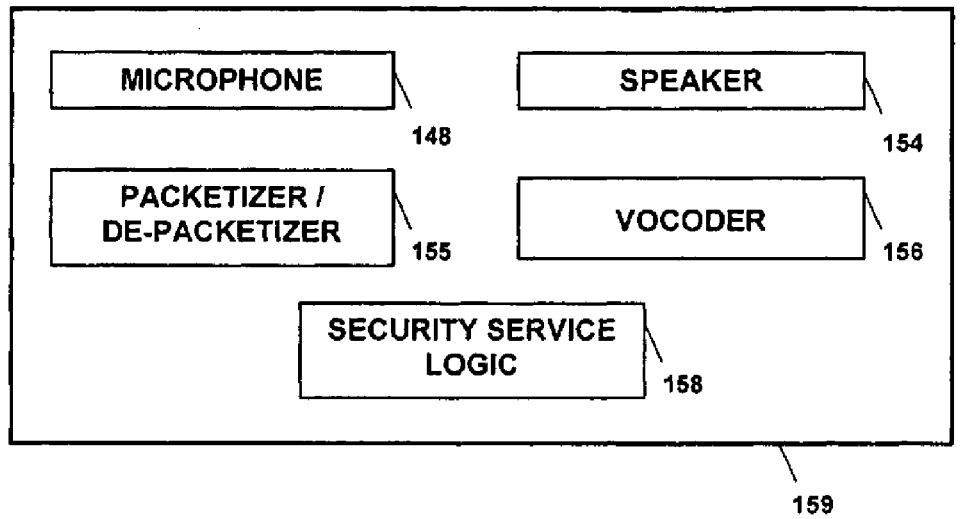
FIG. 7 shows modified PoC client with security service logic.

Note that remote monitoring device 180,184 consists of additional software that adds to standards based PoC client software 157 to enable security related functionality as shown in FIG. 7.

This setup of data gathering agents 12, inter-data gathering agent connectivity 14, active gateway 16, modified PoC server 32 and remote monitoring devices 180,184 constitutes a security system 52 in accordance with preferred embodiment of present invention.

At this point the entire end to end security system is setup and ready to be used. The following paragraphs describe runtime behavior of security system 52.

After security system 52 setup is completed, data gathering agents 12 constantly gather snapshots of data 11 about monitored resources 10. Two consecutive snapshots are compared to detect any change in data and if a change is detected, then a data change event 15 is generated. This data change event 15 and corresponding data 11 are then transferred to active gateway 16 using inter-data gathering agent connectivity 14.

The active gateway 16 decides if the data change event 15 and corresponding data 11 received are due to an emergency situation. This decision is made by conditions and corresponding actions 171 setup in active gateway 16.

If an emergency event is detected at active gateway 16, a cellular wireless half duplex call 62 to the emergency contact list 82 in modified PoC server 32 is initiated. Then modified PoC server 32 detects that a call initiated is an emergency call and invokes call accept override method 94 to override call accept preferences of owners 48 and helpers 50. This overrides any call blocks that may have been requested by owners 48 and helpers 50. This is further detailed in data dispatching process in FIG. 13.

After this, modified PoC server 32 checks if emergency fast call setup method 236 is available, and if it is available, emergency fast call setup method 236 is invoked which in turn invokes fast call setup method 68. This enables transfer of data without waiting for a call establishment acknowledgement from owner 48 or helper 50 hence saving valuable time in dispatching emergency data. As per 3GPP and OMA specifications, fast call setup procedure allows data to be transferred to participants of a cellular wireless half duplex call 62 even without a confirmation that a cellular wireless half duplex call 62 creation has been successful. This enables data 11 from active gateway 16 to be instantly transferred to owners 48 and helpers 50 in an emergency. As per 3GPP and OMA specifications, end to end latency for cellular wireless half duplex call 62 is less than two seconds thereby providing a security system that dispatches data end-to-end in less than two seconds.

Note that all users in emergency contact list 82 are called irrespective of their availability indicated by presence information 71 that is known to both modified PoC server 32 and prior art PoC Server 72. This method of calling all users is only possible with cellular wireless half duplex call 62 since overheads of setting up a cellular wireless half duplex call 62 using fast call setup method 68 are much lower than a cellular wireless full duplex call.

Cellular wireless half duplex call 62 initiation establishes a communication channel between active gateway 16, list of owners 48 and list of helpers 50. This communication channel provides a medium to exchange text, audio, image, graphics and video data. At this stage, if at least one owner 48 is present in cellular wireless half duplex call 62, one of the owners 48 is nominated as moderator 255 of cellular wireless half duplex call 62. If no owner 48 is present then one of the helpers 50 is nominated as a moderator 255. Choice of moderator 255 can be made automatically by modified PoC server 32 or can be done on an interactive basis by any owner 48 or helper 50. This is further detailed in call control process in FIG. 17.

The nominated moderator 255 assigns call ownership to active gateway 16 whenever there is need for more data. If there are more than one data gathering agents 12 transferring data to active gateway 16 then such data 11 is queued at active gateway 16 until moderator 255 requests for more data. This method of assigning ownership is necessary since cellular wireless half duplex call 62 is a half duplex communication medium and at most one of active gateway 16, helper 50 or owners 48 can transfer data at a given point in time. Otherwise there would be a conflict in conversations between active gateway 16, helpers 50 and owners 48. This is further detailed in call control process in FIG. 17.

It is also possible to drop out of cellular wireless half duplex call 62 once sufficient help is established. But if sufficient help is not available then helpers 50 can expand cellular wireless half duplex call 62 by inviting helpers in their emergency contact list into cellular wireless half duplex call 62. This is further detailed in call expansion process in FIG. 15.

After sufficient numbers of helpers are available in cellular wireless half duplex call 62, data 11 can be exchanged between helpers 50, owners 48 and active gateway 16 on an interactive basis.

Emergency contact list 82 can also be established using time zone information of helpers 50. This enables round the clock monitoring without the need for a centralized monitoring agency.

This concludes the description of methods to setup and operate security system 52. The following paragraphs describe various parts of security system 52 in further detail.

Figure 2:
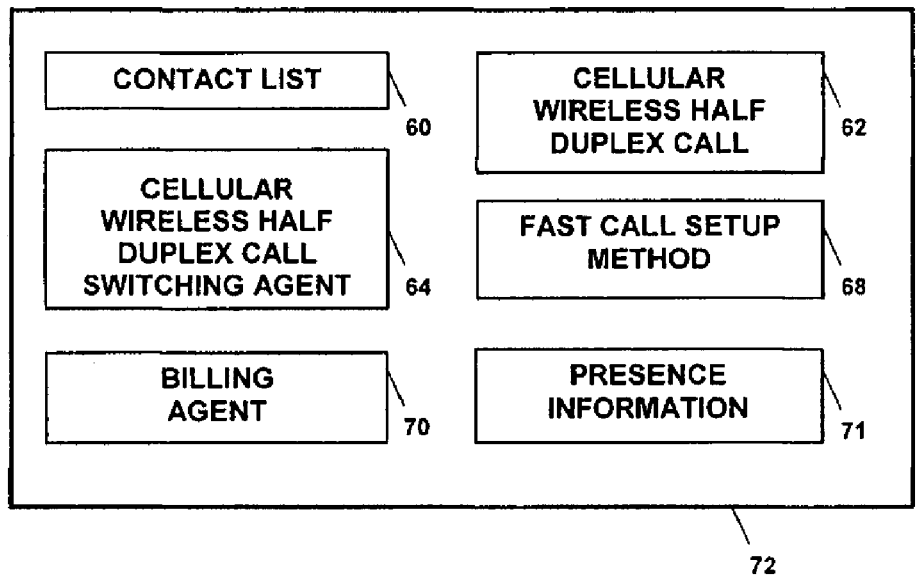
FIG. 2 shows a prior art Push-to-Talk over cellular (PoC) server.

FIG. 2 shows a prior art PoC server 72. The prior art PoC server 72 is currently deployed by many operators and is compliant with 3GPP and OMA specifications. It enables setting up of a contact list 60 to make a cellular wireless half duplex call 62 to contact list 60. Voice that gets transferred to cellular wireless half duplex call 62 is switched by call switching agent 64 that is part of prior art PoC server 72. The prior art PoC Server 72 provides methods to invoke a fast call setup method 68 when necessary. The prior art PoC Server 72 provides a billing agent 70 to charge users of cellular wireless half duplex call 62. Presence information 71 is also tracked by prior art PoC Server 72.

FIG. 3 shows a modified PoC server 32 that consists of additional functionality to enable usage of prior art PoC server 72 in security system 52. Method 81 enables setting up a emergency contact list 82 for emergency purposes in modified PoC server 32. This emergency contact list 82 is different from other contact lists a user might have. When cellular wireless half duplex call 62 is initiated for emergency contact list 82, method 96 enables prioritization of such emergency calls as compared with non-emergency cellular wireless half duplex calls. After call prioritization call accept preferences are overridden using method 94 to enable widest possible access to owners 48 and helpers 50. Then emergency fast call setup set method 236 is invoked which in turn invokes fast call setup method 68 to establish a cellular wireless half duplex call 62 to establish a communication channel between modified PoC server 32 and owners 48 and helpers 50. Method 254 enables nominating a moderator 255 who can take ownership of cellular wireless half duplex call 62 and also assign ownership of cellular wireless half duplex call 62 to active gateway 16. Process 84 enables redirecting charges that occur due to cellular wireless half duplex call 62 to resource owner 48. Process 100 uses method 92 to generate a session key that provides access control to cellular wireless half duplex call 62. If the set of helpers that are accessible becomes zero or less than a preset threshold, then process 88 generates an alert to owners. If set of helpers 50 that are present in cellular wireless half duplex call 62 is insufficient, process 86 enables expansion of cellular wireless half duplex call 62 to include more helpers 50. Process 102 enables scheduling helpers 50 on a time zone basis.

Figure 4:
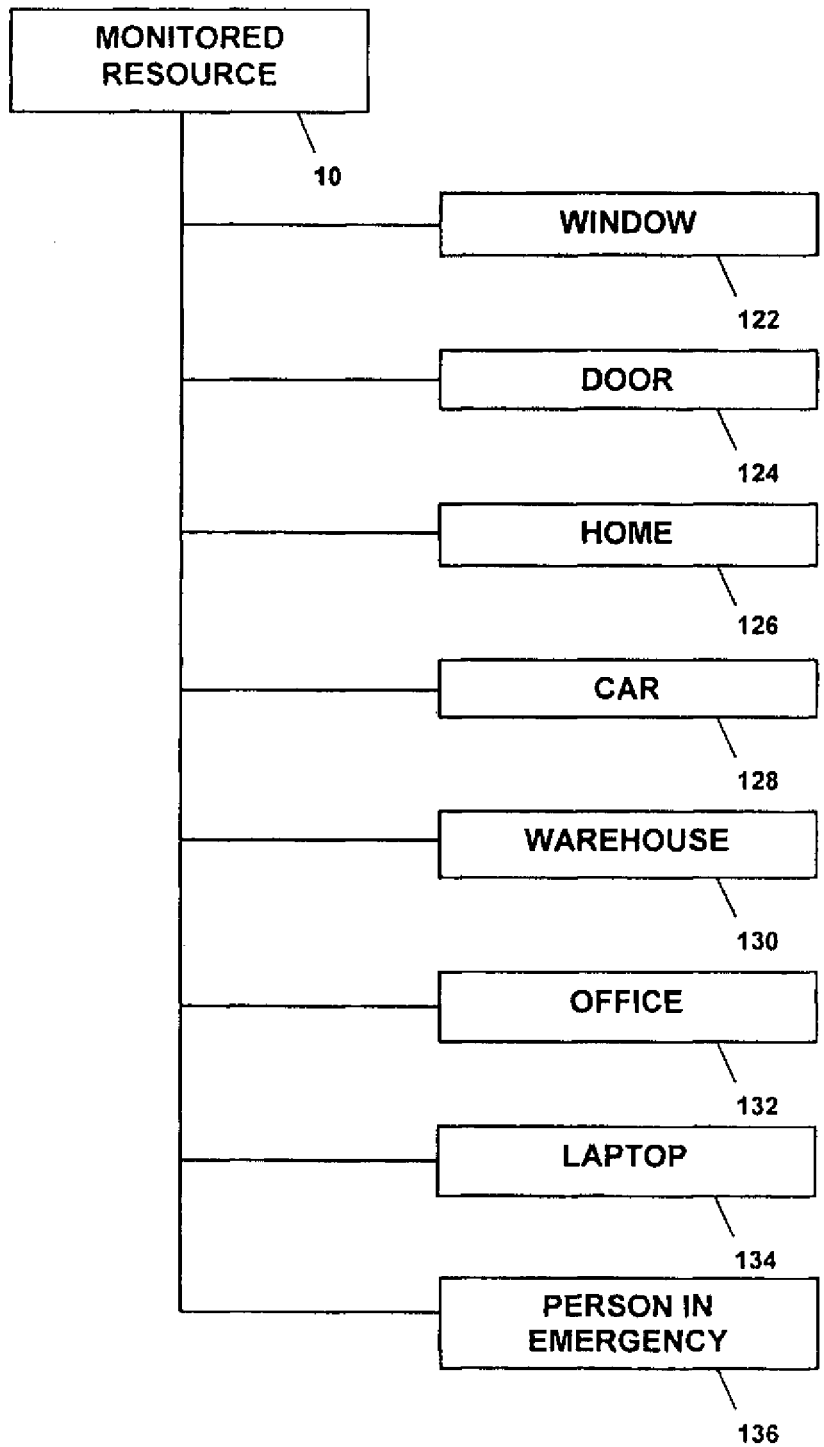
FIG. 4 shows a monitored resource can be one of several items listed in the figure.

FIG. 4 shows a monitored resource 10 can be one of several items comprising window 122, door 124, home 126, car 128, warehouse 130, office 132, laptop 134 and a person in emergency 136. A monitored resource 10 can be any item of value that needs to be monitored or protected. This figure just shows a few of the items as an example.

Figure 5:
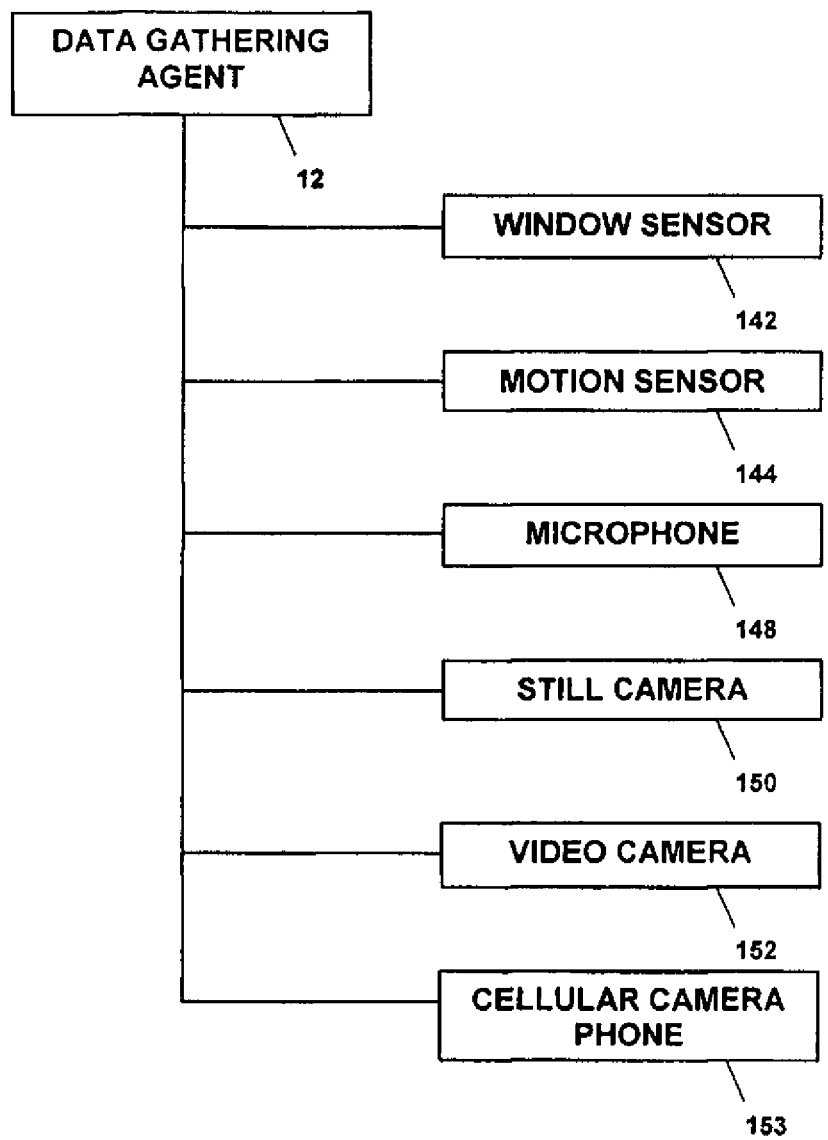
FIG. 5 shows a data gathering agent can be one of several items listed in the figure.

FIG. 5 shows a data gathering agent 12 can be one of several items comprising window sensor 142, motion sensor 144, microphone 148, still camera 150, video camera 152, cellular camera phone 153. A data gathering agent 12 can be any item that helps in gathering data about a monitored resource 10. This data could depict that a window is open or a door is open or a motion has been detected in a region or some audio has been detected or an image that is not supposed to change has changed or a person in emergency is calling for help. All such data change is sensed by data gathering agents 12 and these data gathering agents 12 are connected to active gateway 16 by inter-data gathering agent connectivity 14.

Figure 6:
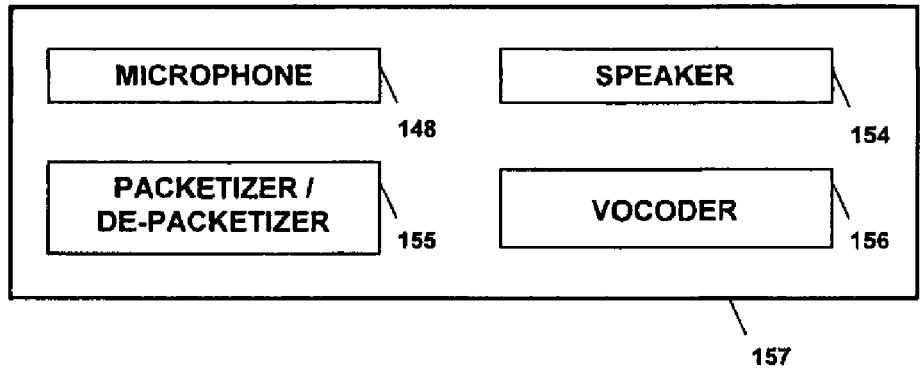
FIG. 6 shows standards based PoC client—prior art.

FIG. 6 shows components of a standards based PoC client 157 from prior art. A standards based PoC client has a microphone 148, speaker 154, packetizer/de-packetizer 155, and a vocoder 156.

FIG. 7 shows components of modified PoC client 159. A modified PoC client has all the functionality of a standards based PoC client 157 and additional security service logic 158. This security service logic 158 interacts with call control process 170 and call access control process 100 to co-ordinate access to active gateway 16 and provide access control to a standards based PoC client 157. Note that modified PoC client is part of owner 48 and helper 50 devices. Security service logic 158 acts as a bridge between standards based PoC client 157 and other security related functionality in client device.

Figure 8:
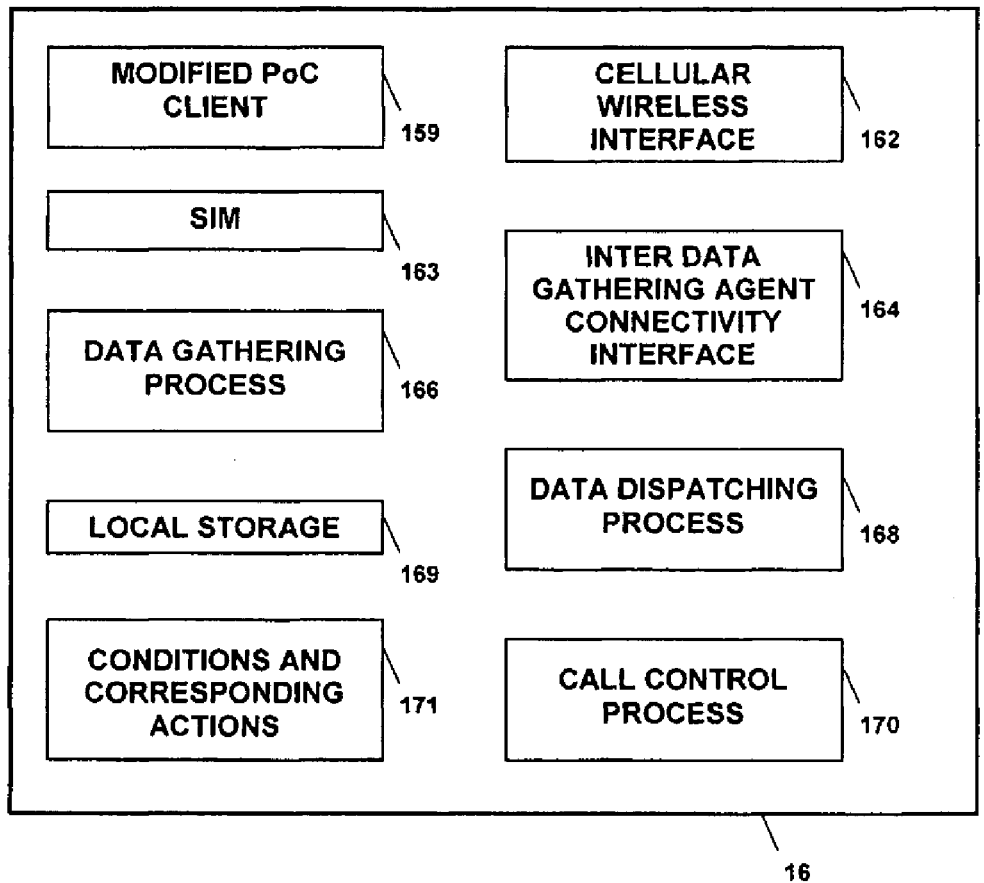
FIG. 8 shows active gateway device components.

FIG. 8 shows components of active gateway 16 device. Active gateway 16 is a data gathering agent 12 with cellular wireless interface 162. Active gateway 16 also includes a modified PoC client 159. Standards based PoC client 157 provides functionality to establish a cellular wireless half duplex call 62. Modified PoC client 159 converts data from data gathering agents 12 to appropriate data formats that can be transferred into cellular wireless half duplex call 62. Modified PoC client 159 also listens to call ownership assignment messages before initiating further transfer of data after the first transfer that is done while establishing cellular wireless half duplex call 62. Active gateway 16 has a cellular wireless interface 162 to connect to cellular wireless network 42 and a inter-data gathering agent connectivity interface 164 to connect to other data gathering agents 12. Active gateway 16 uses an optional SIM 163 card to identify itself to cellular wireless network. Data gathering process 166 enables collection of data 11 from data gathering agents 12 and dispatching data 11 to owners 48 and helpers 50 using data dispatching process 168. Once cellular wireless half duplex call 62 is established, call control process 170 enables active gateway 16 to receive call control messages. Note that there can be more than one gateway in the system and only one is used as active gateway 16 and others can be setup as standby gateways 28. A set of conditions and corresponding actions 171 enables active gateway 16 to determine if a data change event 15 is an emergency event and corresponding action to be taken. If data change event 15 is not an emergency event, then corresponding data 11 is logged into local storage 169.

Figure 9:
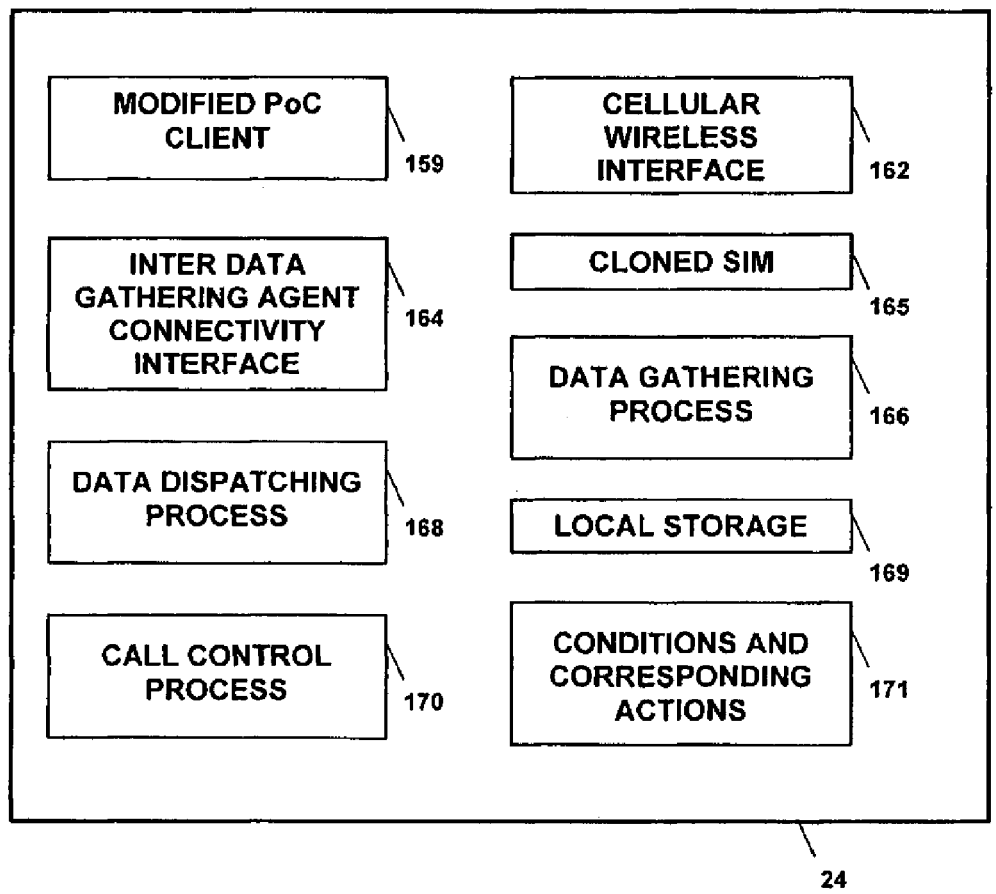
FIG. 9 shows standby gateway device components.

FIG. 9 shows components of standby gateway 28 device. Standby gateway 28 has the same functionality as active gateway 16 but with one change. Standby gateway has a cloned SIM 165 instead of a regular SIM 163 so that when an active gateway 16 goes out of service due to several possible reasons including loss of power, equipment malfunction; interference etc. standby gateway 28 takes over the functionality of active gateway 16 thus providing fault tolerance into security system 52.

Figure 10:
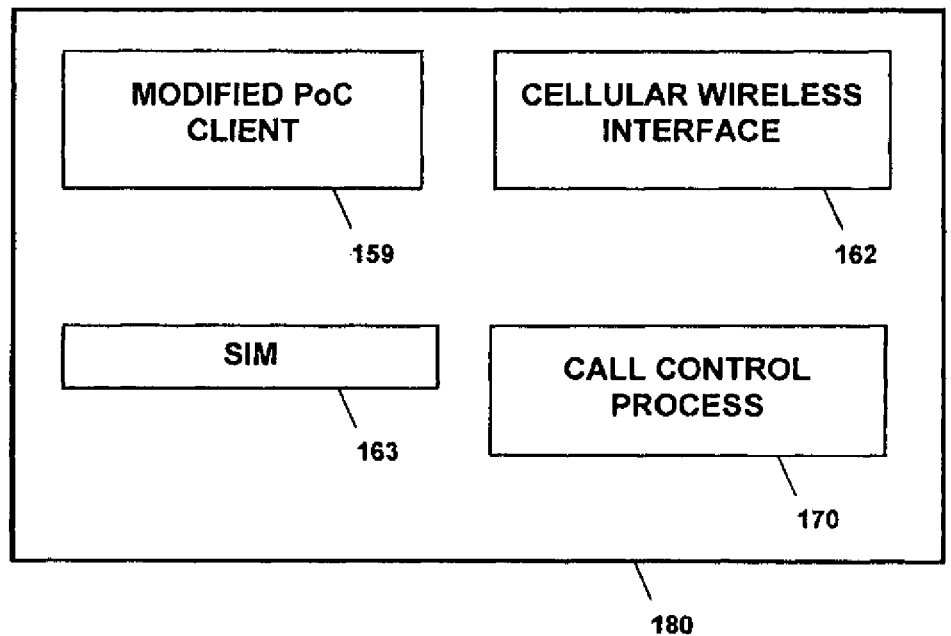
FIG. 10 shows remote monitoring device in possession of owners.
Figure 11:
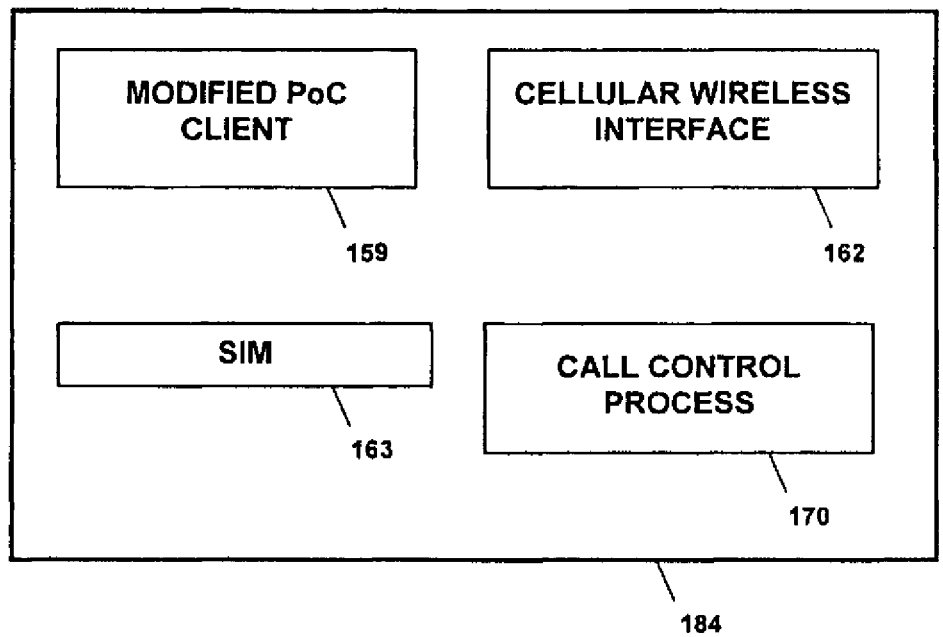
FIG. 11 shows remote monitoring device in possession of helpers.

FIG. 10 and FIG. 11 show components of remote monitoring devices 180,184 in possession of owners 48 and helpers 50. Remote monitoring devices 180,184 include a cellular wireless interface 162 that enables connectivity to said cellular wireless network 42. Modified PoC Client 159 enables usage of standards based PoC client 157 to interact with security related call control process 170. Call control process 170 enables helpers 50 and owners 48 to moderate call ownership assignment of cellular wireless half duplex call 62 to said active gateway 16 on a need by basis.

Figure 12:
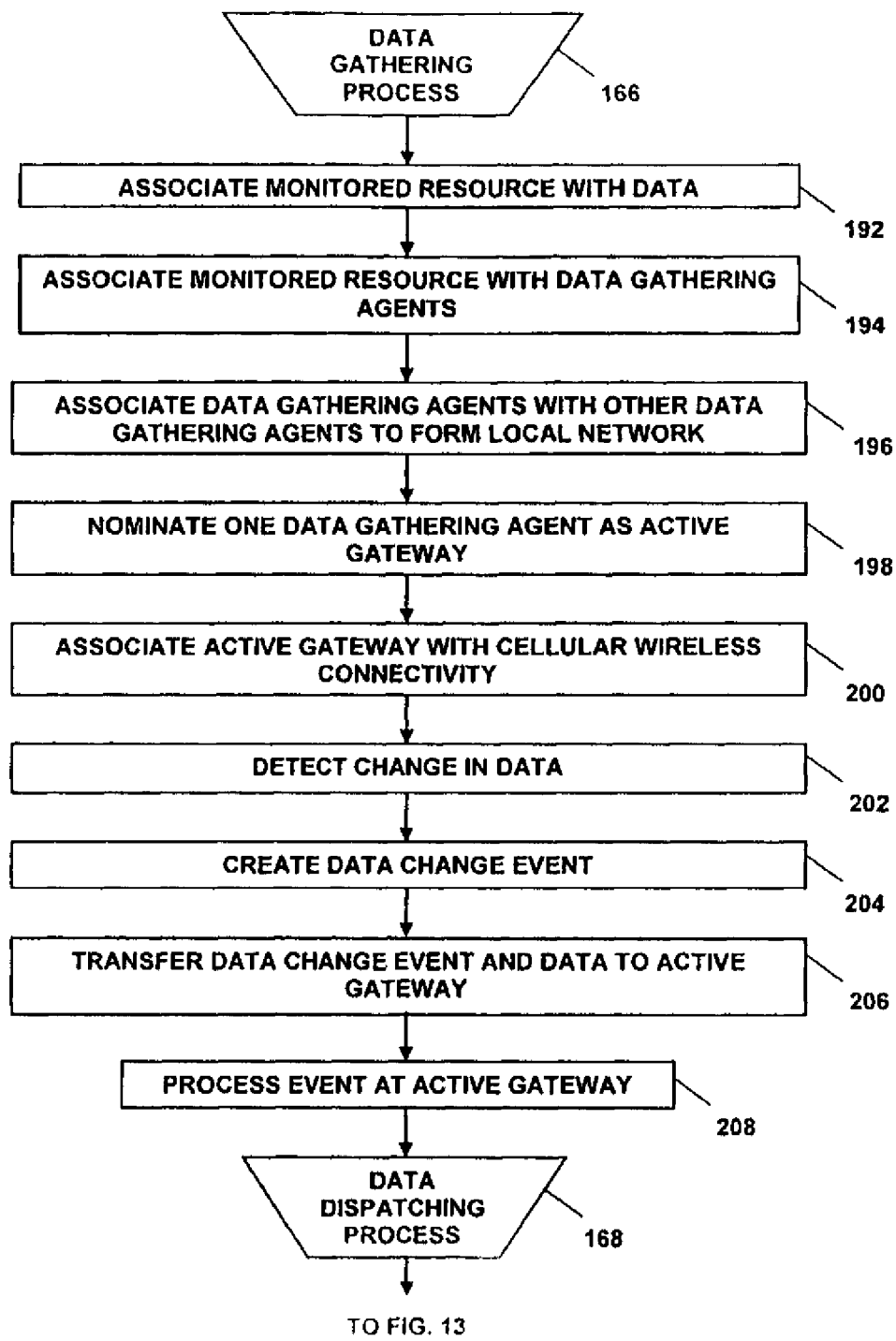
FIG. 12 shows a flow chart depicting data gathering process in accordance with preferred embodiment of present invention.

FIG. 12 shows a flow chart depicting data gathering process 166 in accordance with preferred embodiment of present invention. The first step 192 is to associate a monitored resource 10 with data 11 that needs to be transferred. In next step 194, a monitored resource 10 is associated with at least one data gathering agent 12. Then in step 196 data gathering agents 12 are associated with other data gathering agents 12 to form inter-data gathering agent connectivity 14. After inter-data gathering agent connectivity 14 is formed, one of data gathering agents 12 is nominated as an active gateway 16 in step 198. Active gateway 16 is then associated with cellular wireless connectivity 18 in step 200. Once these associations are established, two consecutive snapshots of data 11 from monitored resource 10 are compared to detect if there is a change in data as in step 202. If a change in data 11 is detected, a data change event 15 is created as in step 204. After this, both data change event 15 and associated data 11 are transferred to active gateway 16 as in step 206 using inter-data gathering agent connectivity 14. Further processing of data change event 15 and associated data 11 are done at active gateway 16 as in step 208 that leads to data dispatching process 168 as described in FIG. 13.

Figure 13:
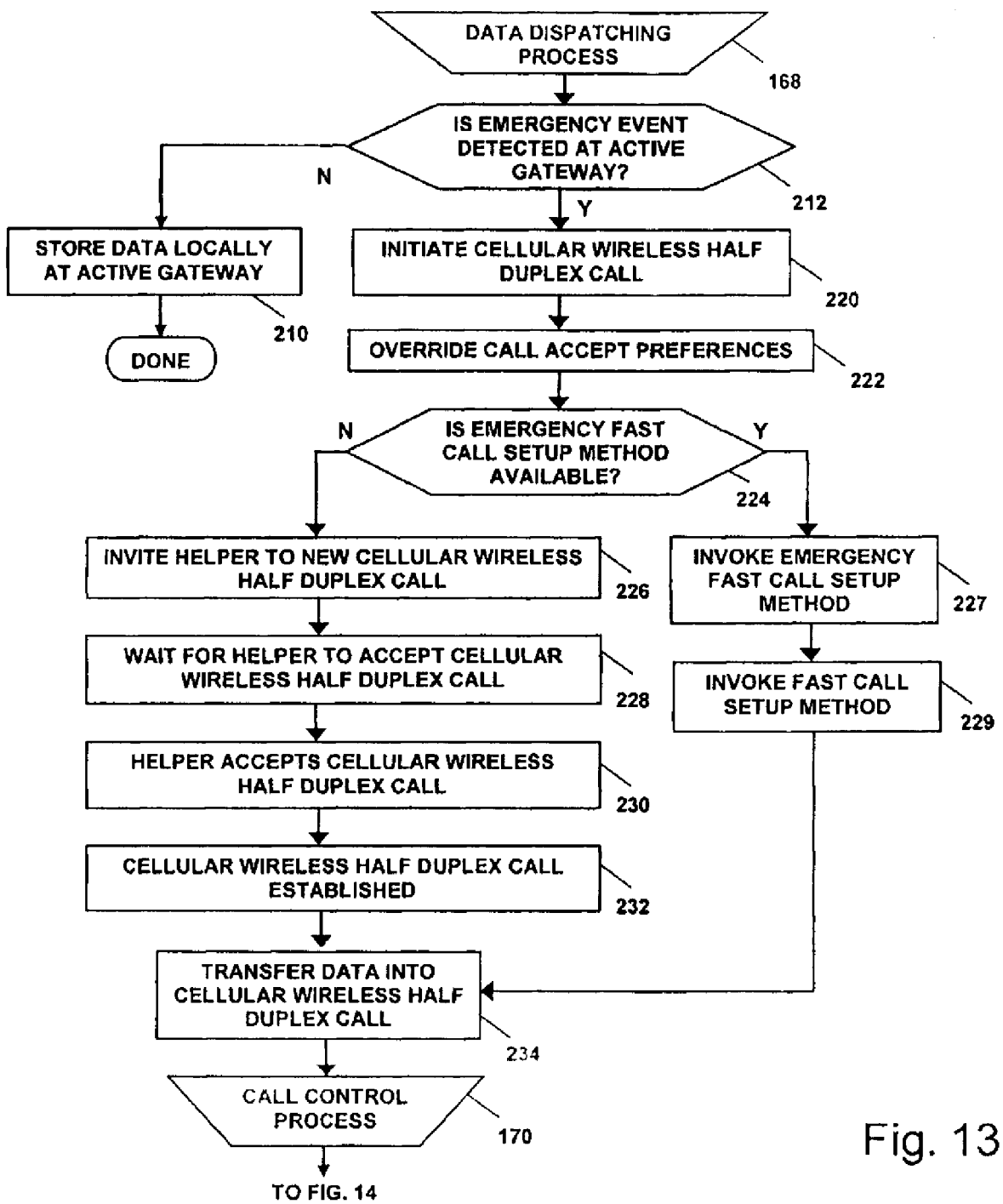
FIG. 13 shows a flow chart depicting data dispatching process in accordance with preferred embodiment of present invention.

FIG. 13 shows a flow chart depicting data dispatching process 168 in accordance with preferred embodiment of present invention. At active gateway 16 both data change event 15 and corresponding data 11 are evaluated to detect if there is an emergency as in step 212. If an emergency is detected, a cellular wireless half duplex call 62 is initiated as in step 220. If an emergency is not detected, then corresponding data change event 15 and data 11 are logged in local storage 169 at gateway as in step 210 for later audits. Local storage 169 could be based on flash, random access memory or mini disk. If a cellular wireless half duplex call 62 is initiated as in step 220, call accept preferences of owners 48 and helpers 50 are evaluated and overridden as in step 222 to remove any call blocking preferences that may have been requested. Then a check for availability of emergency fast call setup method 236 is made as in step 224. If emergency fast call setup method 236 is available, then emergency fast call setup method 236 is invoked in step 227 which in turn invokes fast call setup method 68 as in step 229 to transfer data 11 to cellular wireless half duplex call 62 as in step 234. If emergency fast call setup method 236 is not available, then the usual round trip requests to invite and wait for helpers to accept calls are executed as in steps 226, 228, 230 and 232. Hence it can be noted that using emergency fast call setup method 236 saves many round trip requests thereby enabling data transfer with minimal round trips and hence enhancing emergency response times significantly.

Figure 14:
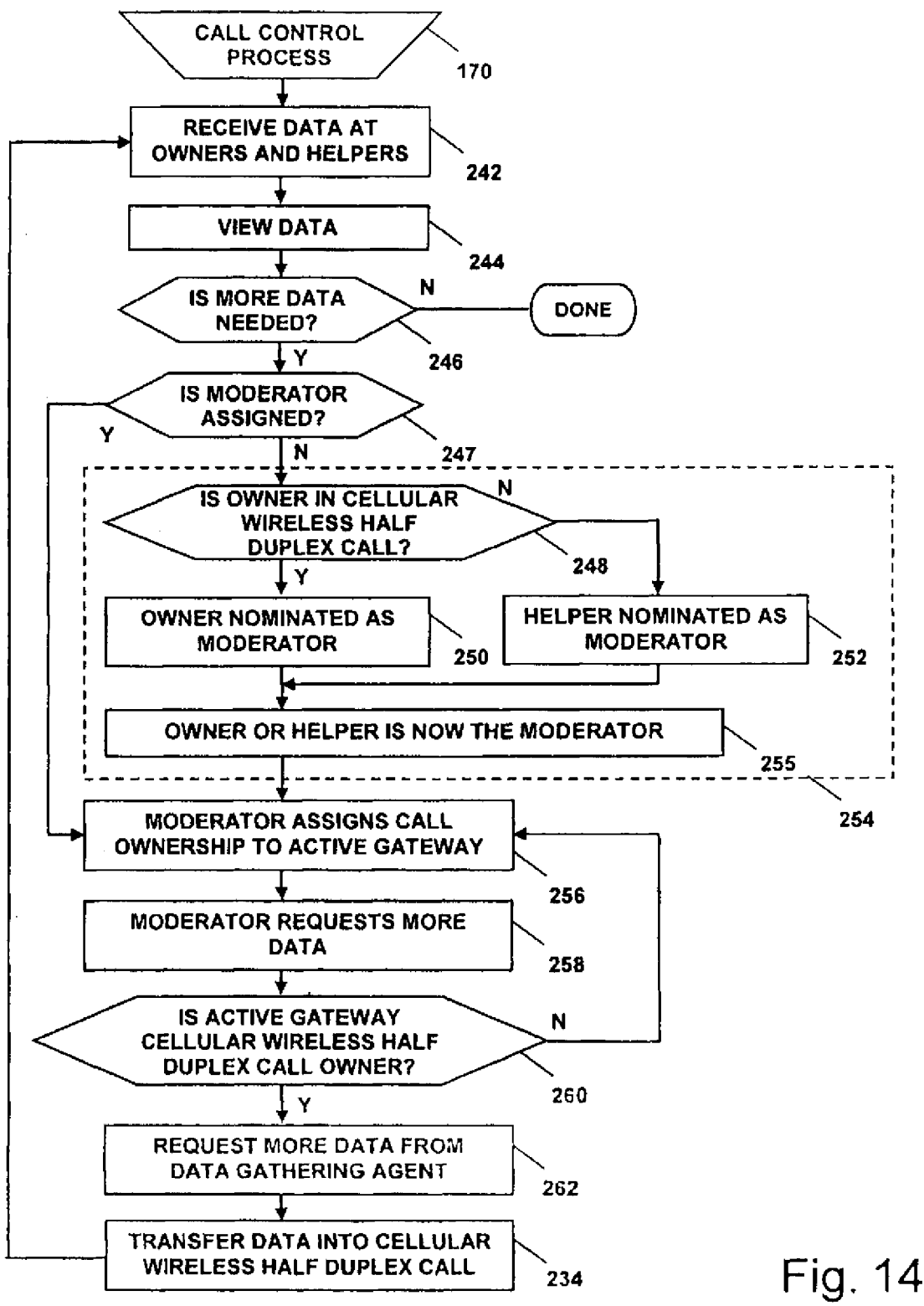
FIG. 14 shows a flow chart depicting call control process in accordance with preferred embodiment of present invention.

FIG. 14 shows a flow chart depicting call control process 170 in accordance with preferred embodiment of present invention. Once a cellular wireless half duplex call 62 has been established, data transfer into cellular wireless half duplex call 62 begins and is received at remote monitoring devices 180,184 in possession of owners 48 and helpers 50 at step 242. This data 11 is viewed in step 244 and then a check 246 for more data is made based on an emergency situation. If more data is needed then a check 247 is made to assign ownership of cellular wireless half duplex call 62. If cellular wireless half duplex call 62 ownership is not assigned then a check 248 for owner 48 is made. If an owner 48 is present in cellular wireless half duplex call 62, then any present owner 48 nominated as a moderator 255 of cellular wireless half duplex call 62 as in step 250. If at least one owner 48 is in call then any one of them is nominated as a moderator 255. If no owners 48 are present then any one of the helpers 50 is nominated as a moderator 255 as in step 252. This procedure of nominating a moderator 255 can be done automatically by system or can be mutually agreed upon in the cellular wireless half duplex call 62. The nominated moderator 255 then assigns ownership of call to active gateway 16 as in step 256, so that more data 11 can be transferred from active gateway 16 into cellular wireless half duplex call 62. More data 11 can be requested only by nominated moderator 255 of cellular wireless half duplex call 62 as in step 258. If active gateway 16 becomes call owner as in step 260 then active gateway 16 will request for more data 11 from other data gathering agents as in step 262. This data 11 is then dispatched to all participants of cellular wireless half duplex call 62 as in step 234.

Figure 15:
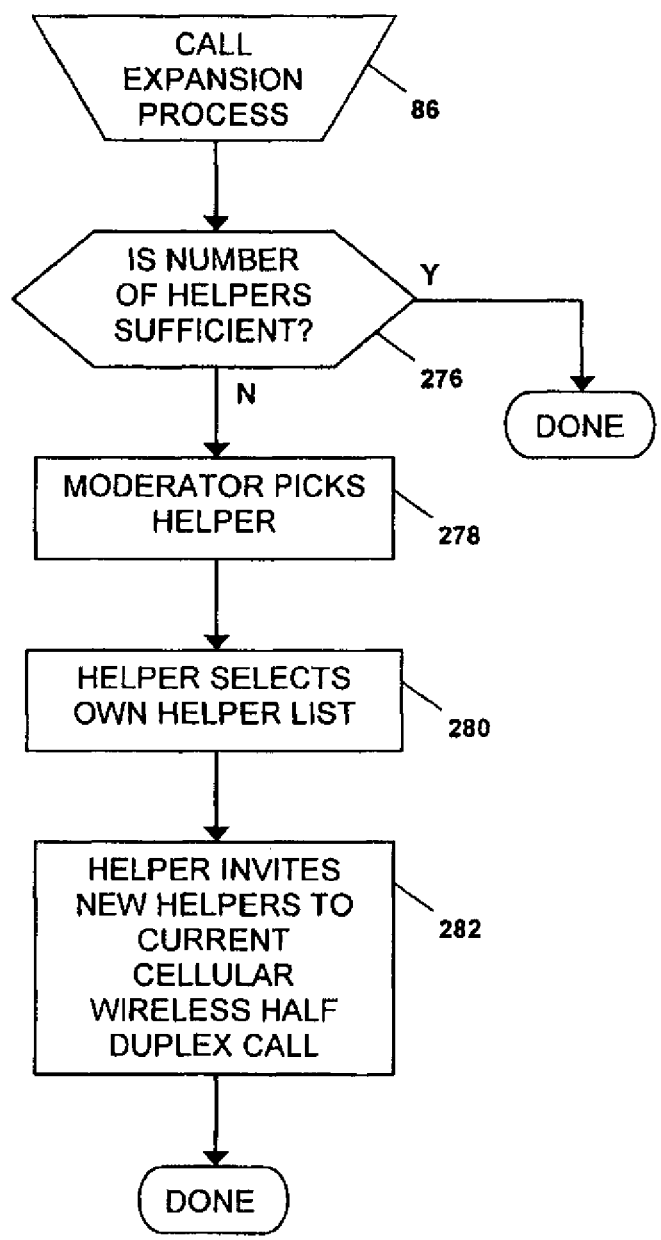
FIG. 15 shows a flow chart depicting call expansion process in accordance with preferred embodiment of present invention.

FIG. 15 shows a flow chart depicting call expansion process 86 in accordance with preferred embodiment of present invention. If helpers 50 in a cellular wireless half duplex call 62 is not sufficient as in step 276, then moderator 255 picks helper 50 as in step 278 who then selects his/her own helper list using his emergency contact list 82 as in step 280 to invite a new set of helpers into current cellular wireless half duplex call 62 as in step 282.

FIG. 16 shows a flow chart for billing redirect process 84 in accordance with preferred embodiment of present invention. For billing purposes, a check 292 is made to see if any helpers 50 are part of cellular wireless half duplex call 62. If helpers 50 are present in cellular wireless half duplex call 62, then the wireless call usage of helpers 50 is added to the total wireless usage as in step 294. If helpers 50 are not part of the cellular wireless half duplex call 62, then for billing purposes a check 298 is made to see if any owners 48 are part of cellular wireless half duplex call 62. If owners 48 are in the cellular wireless half duplex call 62, then the wireless call usage of owners 48 is added to the total wireless usage as in step 296. At the next step 300, the wireless usage of the gateway is added to total wireless usage. The owner 48 is then charged for the total wireless usage as in step 302.

Figure 17:
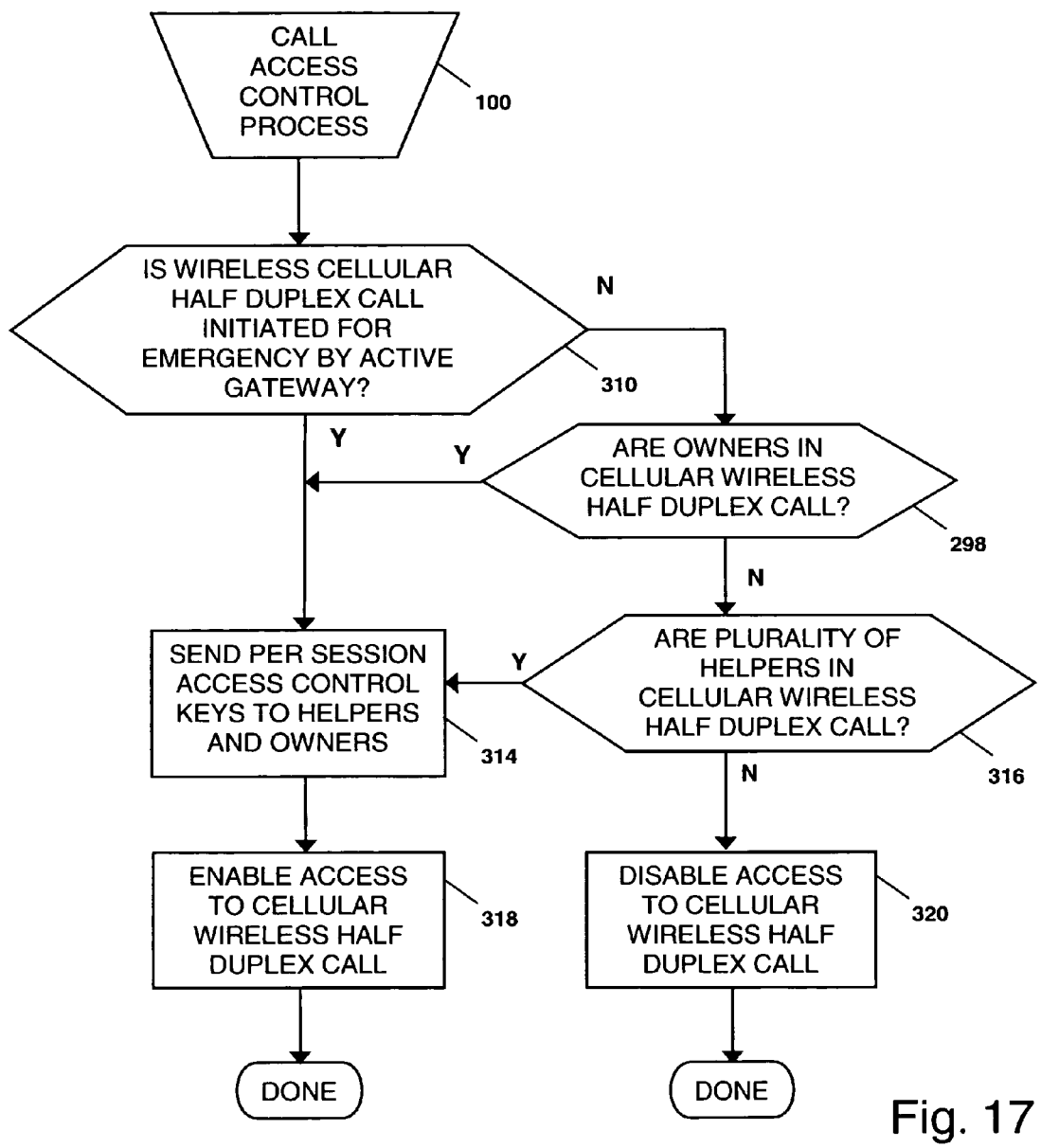
FIG. 17 shows a flow chart for call access control process in accordance with preferred embodiment of present invention.

FIG. 17 shows a flow chart for call access control process 100 in accordance with preferred embodiment of present invention. This process 100 is implemented in modified PoC server 32. A check 310 is made to verify if call initiated by active gateway 16 is for an emergency and if it is found to be an emergency related call, then per session access control keys are generated and sent to owners 48 and helpers 50 as in step 314 that enables access to cellular wireless half duplex call 62 as in step 318. In case of non-emergency events, a check 298 is made to see if owners 48 are in cellular wireless half duplex call 62. If the owners are not in cellular wireless half duplex call 62, a plurality check 316 is made for plurality of helpers 50 to be present in a cellular wireless half duplex call 62 before giving access to cellular wireless half duplex call 62 as in step 314. If no owner 48 is present and plurality check 316 fails then access to cellular wireless half duplex call 62 is denied as in step 320.

Figure 18:
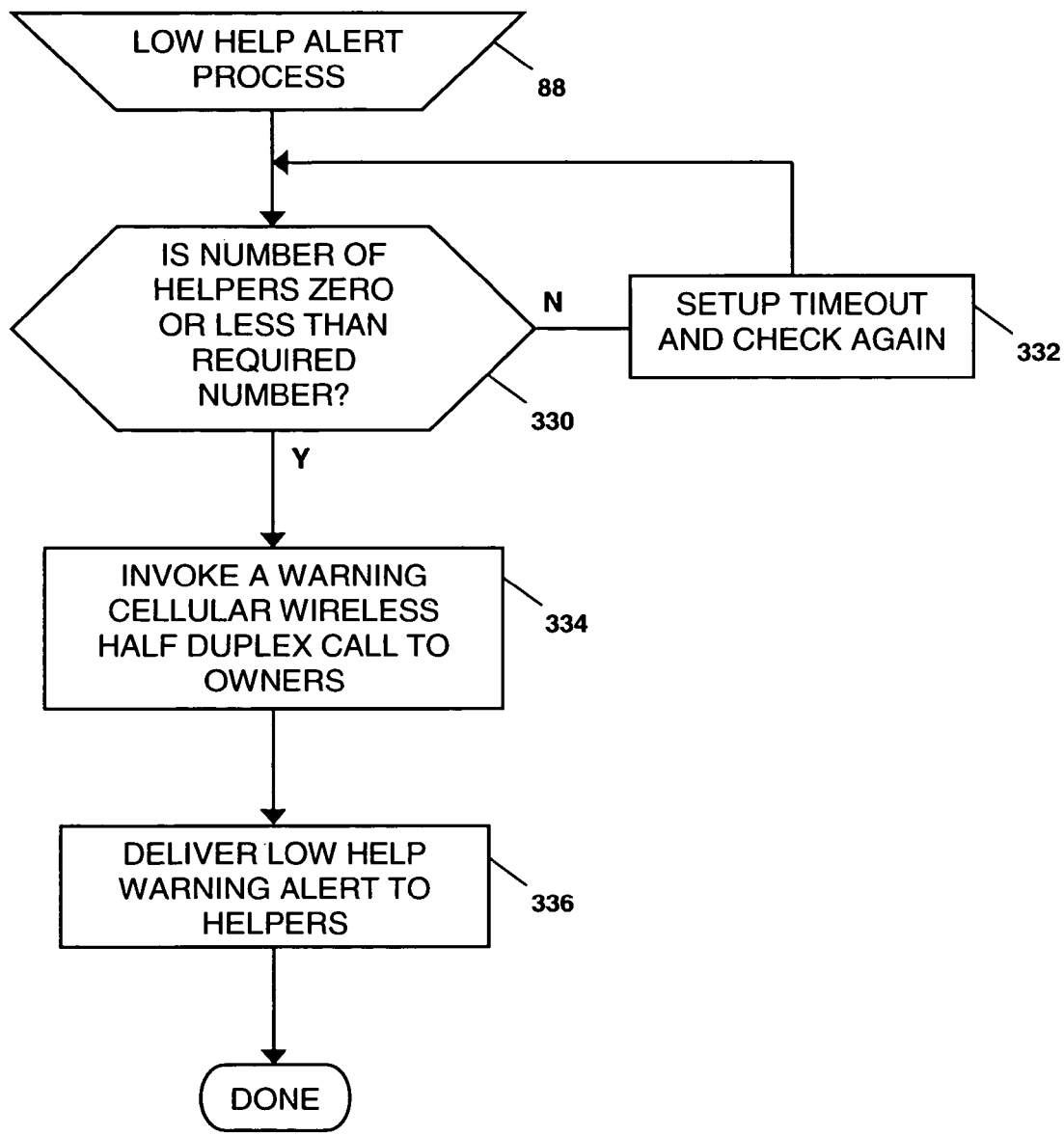
FIG. 18 shows a flow chart for low help alert process in accordance with preferred embodiment of present invention.

FIG. 18 shows a flow chart for low help alert process 88 in accordance with preferred embodiment of present invention. A check 330 is made in modified PoC server 32 to see if number of helpers 50 is zero or less than the required number. If check 330 is true, then a warning cellular wireless half duplex call 62 is made as in step 334 to owners 48 and a low help warning alert is delivered to helpers 50 as in step 336. If check 330 is false, then a timeout as in step 332 is setup and check 330 is scheduled again.

Figure 19:
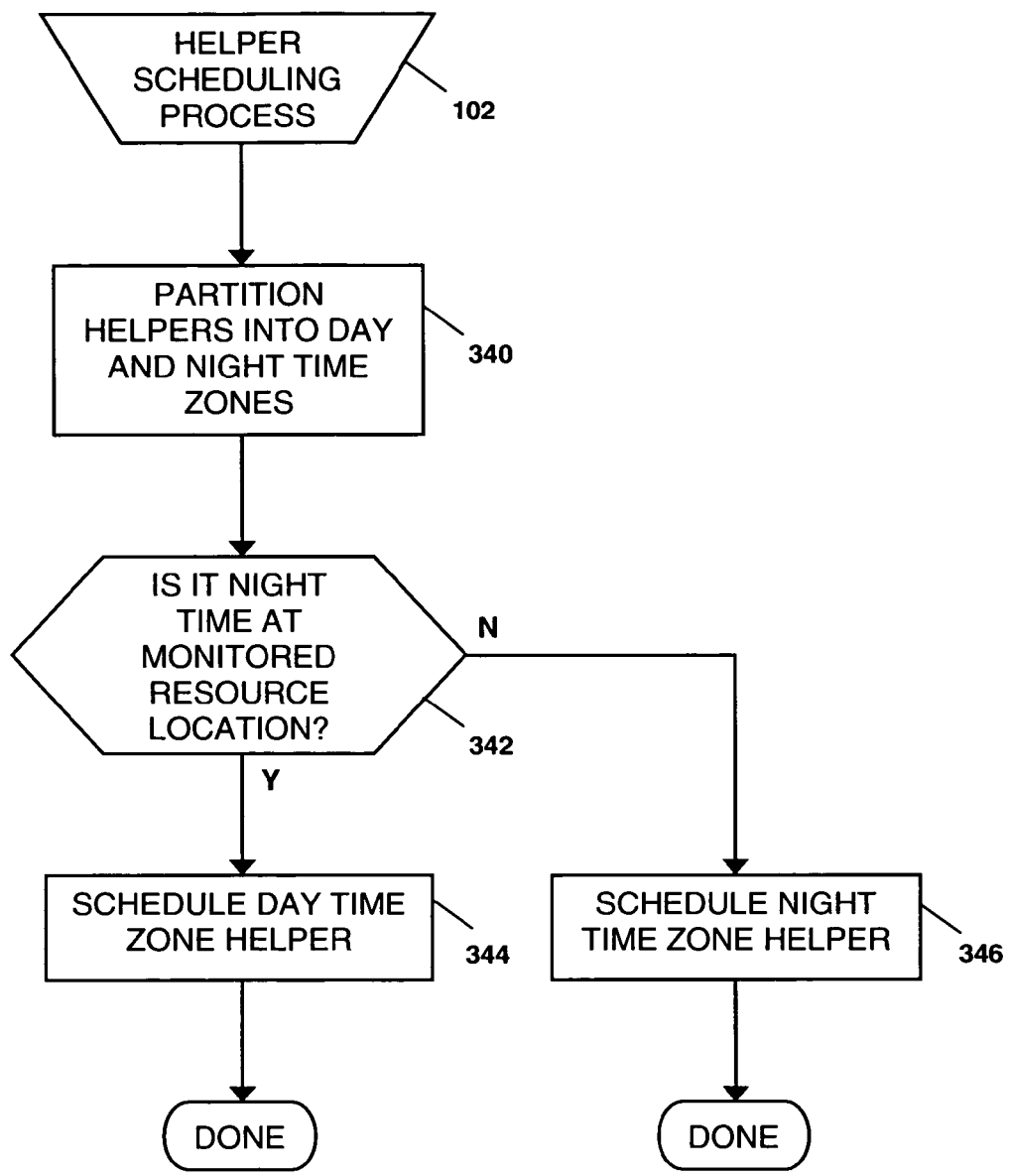
FIG. 19 shows a flow chart for helper scheduling process in accordance with preferred embodiment of present invention.

FIG. 19 shows a flow chart for helper scheduling process 102 in accordance with preferred embodiment of present invention. This process enables setting up helpers 50 based on time zones in which each of these helpers 50 reside in. The helpers 50 are partitioned into day and night time zones based on their locality as in step 340. A check 342 is made if it is nighttime at monitored resource 10 location and if check 342 is successful, then day time zone helpers 50 are scheduled as in step 344. If check 342 is not successful, then night time zone helpers 50 are scheduled as in step 346.

Alternative Embodiments

Several embodiments of present invention are realized by substituting inter-data gathering agent connectivity 14 with technologies such as Bluetooth, Wireless LAN, wired Ethernet, Zigbee, wired twisted pair cabling, HomeRF, inter-chip connectivity and inter-software module connectivity between data gathering agents and gateway.

Similarly, PoC based cellular wireless half duplex call 62 can also be substituted with a half duplex call by Nextel communications Direct connect service or a half duplex call provided by QChat service from Qualcomm. In this case corresponding client server should be used.

Cellular wireless network connectivity 18 between gateway data gathering agents 12 and cellular wireless network 42 can be established using network technology such as second generation cellular wireless network or two point five generation cellular wireless network or third generation cellular wireless network or high speed cable modem internet connection or digital subscriber line internet connection or wireless metropolitan area network connection Said security system using said cellular wireless half duplex call can also be used for personal safety purposes while transferring audio, video and image data into said call to provide fastest connectivity to emergency personnel with maximum possible data to be sent in shortest possible time. In such an embodiment, monitored resource will be a person in emergency and a cellular phone will form a combination of data gathering agent and an active gateway which are interconnected using inter-chip connectivity or inter-software connectivity or both inter-chip connectivity and inter-software.

Advantages

From the description above a number of advantages of said security system become evident:
a) A remote resource in emergency is connected to at least one owner and/or at least one helper in less than two seconds
b) A emergency call is recognized and given priority among other calls
c) A scalable and commercially viable cellular wireless emergency system is implemented without adding undue burden on cellular wireless network by combining cellular half duplex calls, remote monitoring system and new methods to enable fast connectivity and organized communication.
d) A security system is implemented that has fault tolerance to recover from gateway errors that could be a single point of failure.
e) Emergency group expansion is possible by requesting for an entirely new group to be added into the call with a single request operation, hence maximizing the chance of getting help in case of an emergency.
f) All cellular charges that are incurred during an emergency call are billed to the owner of resource that originated emergency call. This will encourage helpers to join into emergency calls however frequent such calls may be.
g) Round the clock monitoring is possible even without a centralized monitoring agency.

CONCLUSION, RAMIFICATIONS AND SCOPE

Accordingly, the reader will see that combining a remote monitoring system with cellular wireless half duplex call provides the most scalable, efficient and commercially viable security system using standard 2G, 2.5G and 3G cellular wireless networks.

Although the description above contains many specificities, these should not be construed as limiting the scope of invention but merely as providing illustrations of some of the presently preferred embodiments of this invention. Thus the scope of this invention should be determined by appended claims and their legal equivalents, rather than by example given.

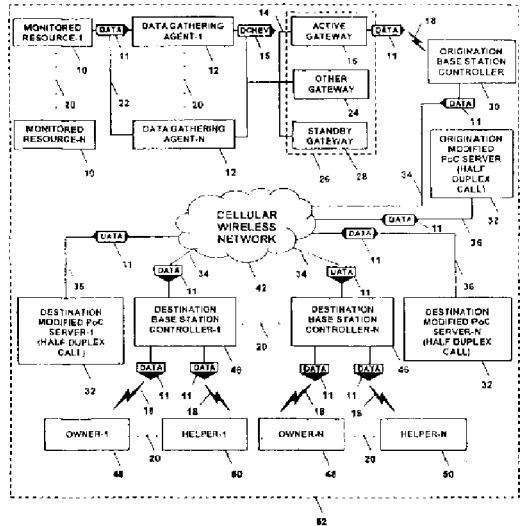

The invention claimed is:

1. A method in a security system for setting up an instant communication channel between a set of monitored resources, group of owners and group of helpers using half duplex communication call of second generation, two point five generation and third generation cellular wireless networks, said method comprising:
 a) associating said monitored resource with data to be communicated in said call;
 b) associating said monitored resource with at least one data gathering agent;
 c) associating said data gathering agent with at least one other said data gathering agent to form a local network of said data gathering agents;
 d) nominating one said data gathering agent as a gateway data gathering agent to enable connectivity to said cellular wireless network;
 e) associating said gateway data gathering agent with cellular wireless network connectivity to enable initiation of said call in said wireless network;
 f) detecting change in said data associated with said monitored resource by said data gathering agents;
 g) associating said change in said data with a data change event;
 h) associating said gateway data gathering agent with conditions and corresponding actions in relation to said data change event;
 i) associating one said condition and corresponding action with detection of an emergency situation;
 j) associating one said condition and corresponding action with call initiation procedure of said call;
 k) associating one said condition and corresponding action with data logging procedure in said gateway data gathering agent;
 l) associating said gateway data gathering agent with at least one said owner;
 m) associating said gateway data gathering agent with at least one said helper;
 n) transferring said event from said data gathering agents to said gateway data gathering agent in response to detecting said change in said data;
 o) transferring said data about monitored resource from said data gathering agents to said gateway data gathering agent in response to detecting said change in said data;

p) detecting an emergency situation in said gateway data gathering agent in response to said data change event and associated condition;

q) invoking said corresponding action to initiate said call using said call initiation procedure and said cellular wireless network connectivity in response to detection of said emergency situation and setup said call among said gateway data gathering agent, said helpers and said owners;

r) transferring said data gathered in said emergency situation by said gateway data gathering agent into said call in real time;

s) communicating request for new data from said owners and said helpers back to said gateway data gathering agents to enable gathering more data interactively in real time;

t) communicating request for new data from said gateway data gathering agent to other data gathering agents to request for more data; and u) transferring data from said data gathering agents to said gateway data gathering agent in response to said request for more data.

2. The method in said security system for setting up an instant communication channel of claim 1 wherein said call is established using push to talk over cellular specification from third generation partnership project and open mobile alliance.

3. The method in said security system for setting up an instant communication channel of claim 1 wherein said call is established using direct connect specification from Nextel communications.

4. The method in said security system for setting up an instant communication channel of claim 1 wherein said call is established using Qualcomm Chat specification from Qualcomm.

5. The method in said security system for setting up an instant communication channel of claim 1 wherein said cellular wireless connectivity between said gateway and said cellular wireless network is established using network technology that is selected from group consisting of second generation cellular wireless network and two point five generation cellular wireless network and third generation cellular wireless network and high speed cable modem internet connection and digital subscriber line internet connection and wireless metropolitan area network connection.

6. The method in said security system for setting up an instant communication channel of claim 1 wherein said monitored resource is selected from group consisting of home and window and door and automobile and office and laptop and secure area and secure building and physical object of value and a person in emergency.

7. The method in said security system for setting up an instant communication channel of claim 1 wherein said data is selected from group consisting of audio data and video data and voice data and image data and graphics data and textual data.

8. The method in said security system for setting up an instant communication channel of claim 1 wherein said data gathering agent is selected from group consisting of window sensor and motion detector and sound detector and camera and voice detector and cellular camera phones and cellular smart phones and other intrusion detectors.

9. The method in said security system for setting up an instant communication channel of claim 1 wherein said helper is selected from group consisting of emergency response worker and police and neighbor and alarm monitoring company agent and any friend who has volunteered to help in emergency situation.

10. The method in said security system for setting up an instant communication channel of claim 1 wherein said local area network is established using bluetooth specification from bluetooth special interest group.

11. The method in said security system for setting up an instant communication channel of claim 1 wherein said local area network is established using network technology that is selected from group consisting of 802.11 wireless local area network specifications from institute of electrical and electronic engineers and zigbee specification from zigbee alliance.

12. The method in said security system for setting up an instant communication channel of claim 1 wherein said local area network is established using network technology that is selected from group consisting of wired Ethernet and homeRF and wired twisted pair and inter-chip connectivity and inter-software module connectivity.

13. The method in said security system for setting up an instant communication channel of claim 1, further comprising:

overriding call accept preferences of said helpers and said owners during said call initiation procedure of said call if said emergency situation is detected wherein said call accept preference is selected from group consisting of preference to not accept another call while busy in another call and preference to not be disturbed during certain times and preference to turn off ringer and preference to reject unknown callers and preference to accept calls only in interactive mode and preference to accept call in automatic mode; and invoking fast call setup procedure provided by said call during said initiation procedure of said call if said emergency situation is detected.

14. The method in said security system for setting up an instant communication channel of claim 1, further comprising:

nominating a moderator of said call chosen between said resource owners and said helpers who can control said data flow in said call and assign ownership of said call;

assigning ownership of said call to said gateway data gathering agent by said moderator; and filtering said data that is transferred to said gateway data gathering agent to enable selective transfer of said data exchanged in said call.

15. The method in said security system for setting up an instant communication channel of claim 1, further comprising, modifying said call handling billing records to charge said resource owners for said calls.

16. The method in said security system for setting up an instant communication channel of claim 1, further comprising:

providing per session access control keys to said helpers in case of said call initiation to prevent unauthorized access to said data in said call;

requiring plurality of helpers to access said resources in absence of said owner if an interactive access to said monitored resource is requested; and providing logging mechanisms to log said data transferred to said helpers.

17. The method in said security system for setting up an instant communication channel of claim 1, further comprising:

tracking availability of said helpers using presence feature of said cellular wireless network;

generating a warning alert to said owners if none of said helpers is available for help for a configurable amount of time; and requesting at least one said helper to be available if said warning alert has been generated.

18. The method in said security system for setting up an instant communication channel of claim 1, further comprising:
expanding said list of helpers by including more helpers in said call when necessary.

19. The method in said security system for setting up an instant communication channel of claim 1, further comprising:
including helpers from around the world to be called in said call; and
scheduling watch times for helper list based on time zones around the world.

20. A method in said security system for setting up a fault tolerant instant communication channel between a set of monitored resources, group of owners and group of helpers using half duplex communication call of second generation, two point five generation and third generation cellular wireless networks, said method comprising:
 a) associating said monitored resource with data to be communicated in said call;
 b) associating said monitored resource with at least one data gathering agent;
 c) associating said data gathering agent with at least one other said data gathering agent to form a local network of said data gathering agents;
 d) nominating one said data gathering agent as a gateway data gathering agent to enable connectivity to said cellular network;
 e) associating said gateway data gathering agent with cellular wireless network connectivity to enable initiation of said call in said wireless network;
 f) detecting change in said data associated with said monitored resource by said data gathering agents;
 g) associating said change in said data with a data change event;
 h) associating said gateway data gathering agent with conditions and corresponding actions in relation to said data event;
 i) associating one said condition and corresponding action with detection of an emergency situation;
 j) associating one said condition and corresponding action with call initiation procedure of call;
 k) associating one said condition and corresponding action with data logging procedure in said gateway data gathering agent;
 l) associating said gateway data gathering agent with at least one owner;
 m) associating said gateway data gathering agent with at least one said helper;
 n) transferring said event from said data gathering agents to said gateway data gathering agent in response to detecting said change in said data;
 o) transferring said data about monitored resource from said data gathering agents to said gateway data gathering agent in response to detecting said change in said data;
 p) detecting an emergency situation in said gateway data gathering agent in response to said data change event and associated condition;
 q) invoking said corresponding action to initiate said call using said call initiation procedure and said cellular wireless network connectivity in response to detection of said emergency situation and setup said call among said gateway data gathering agent, said helpers and said owners;
 r) transferring said data gathered in said emergency situation by said gateway data gathering agent into said call in real time;
 s) communicating request for new data from said owners and said helpers back to data gathering agents to enable gathering more data interactively in real time;
 t) communicating request for new data from said gateway data gathering agent to other data gathering agents to request for more data;
 u) transferring data from said data gathering agents to said gateway data gathering agent in response to said request for more data;
 v) providing plurality of said cellular wireless network connections to plurality of said gateway data gathering agents to enable fault tolerance in case of failure of one said gateway data gathering agent;
 W) cloning subscriber identity modules and using in said gateway data gathering agents to provide fault tolerance while reusing a single said cellular connection;
 x) organizing said gateway data gathering agents into a failover sequence as active gateway data gathering agent and standby gateway data gathering agent;
 y) changing said association between said data gathering agents and said active gateway to connect to standby gateway when connectivity to said active gateway is lost; and
 z) invoking said standby gateway data gathering agent when connectivity to said active gateway is lost.

* * * * *

UNITED STATES PATENT AND TRADEMARK OFFICE
CERTIFICATE OF CORRECTION

| | |
|---|---|
| PATENT NO. | : 7,577,420 B2 |
| APPLICATION NO. | : 11/354448 |
| DATED | : August 18, 2009 |
| INVENTOR(S) | : Srinivasan et al. |

It is certified that error appears in the above-identified patent and that said Letters Patent is hereby corrected as shown below:

The title page showing the illustrative figure should be deleted to be replaced with the attached title page.

The drawing sheets, consisting of Figs. 1-15, should be deleted to be replaced with the drawing sheets, consisting of Figs. 1-15, as shown on the attached page.

Signed and Sealed this

Twenty-seventh Day of October, 2009

David J. Kappos
*Director of the United States Patent and Trademark Office*

(12) United States Patent
Srinivasan et al.

(10) Patent No.: US 7,577,420 B2
(45) Date of Patent: Aug. 18, 2009

(54) INSTANT HELP SECURITY SYSTEM FOR EMERGENCY HELP USING 2G, 2.5G AND 3G CELLULAR WIRELESSES HALF DUPLEX CALL

(76) Inventors: Sudharshan Srinivasan, 5496 Golubin Common, Fremont, CA (US) 94555; Jai Kumar, 20360 Clifden Way, Cupertino, CA (US) 95014; Kothandraman Ramchandran, 45426 Potawatami Dr., Fremont, CA (US) 94539

(*) Notice: Subject to any disclaimer, the term of this patent is extended or adjusted under 35 U.S.C. 154(b) by 484 days.

(21) Appl. No.: 11/354,448

(22) Filed: Feb. 15, 2006

(65) Prior Publication Data
US 2006/0183460 A1    Aug. 17, 2006

Related U.S. Application Data

(60) Provisional application No. 60/654,024, filed on Feb. 17, 2005.

(51) Int. Cl.
*H04M 11/04* (2006.01)

(52) U.S. Cl. .......... 455/404.1; 455/404.2; 455/518; 455/519; 455/521; 370/296; 370/312; 370/432; 340/287; 340/291; 379/37; 379/42; 379/43; 379/44; 379/51

(58) Field of Classification Search .......... 455/404.1, 455/404.2, 518, 519, 521; 370/296, 312, 370/432; 379/37–51; 340/287–304
See application file for complete search history.

(56) References Cited

U.S. PATENT DOCUMENTS

| | | | |
|---|---|---|---|
| 6,310,549 B1* | 10/2001 | Loflin et al. | 340/547 |
| 6,725,053 B2* | 4/2004 | Rosen et al. | 455/518 |
| 6,874,029 B2* | 3/2005 | Hutcheson et al. | 709/227 |
| 7,233,781 B2* | 6/2007 | Hunter et al. | 455/404.1 |
| 2002/0076003 A1* | 6/2002 | Zellner et al. | 379/49 |
| 2004/0203561 A1* | 10/2004 | Jakubowski | 455/404.1 |
| 2005/0200480 A1* | 9/2005 | Caras et al. | 340/539.22 |
| 2006/0120516 A1* | 6/2006 | Armbruster et al. | 379/37 |
| 2007/0019656 A1* | 1/2007 | Martin et al. | 370/401 |

* cited by examiner

*Primary Examiner*—Charles N Appiah
*Assistant Examiner*—Olumide T Ajibade Akonai

(57) ABSTRACT

A security system (52) using cellular wireless half duplex communication call (62) is provided. The security system (52) comprises a set of monitored resources (10), group of owners (48) and group of helpers (50) connected using said cellular wireless half duplex call (52). The monitored resource (10) is configured to generate an alarm and is coupled with said cellular wireless half duplex call (62). Said owners (48) and helpers (50) are also coupled with said cellular wireless half duplex call (62). In an event of emergency said monitored resource (10) generates an alarm and initiates said cellular wireless half duplex call (62) to connect to said owners (48) and said helpers (50) in shortest possible time without significantly contributing to cellular network load. Said security system (52) provides most scalable, efficient and viable security solution using cellular wireless networks.

20 Claims, 19 Drawing Sheets